US012217683B2

(12) United States Patent
Goh et al.

(10) Patent No.: US 12,217,683 B2
(45) Date of Patent: Feb. 4, 2025

(54) SUB-PIXEL AND DISPLAY DEVICE INCLUDING THE SAME

(71) Applicant: Samsung Display Co., LTD., Yongin-si (KR)

(72) Inventors: Joon Chul Goh, Yongin-si (KR); Sang Hyun Heo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/428,688

(22) Filed: Jan. 31, 2024

(65) Prior Publication Data

US 2024/0347003 A1 Oct. 17, 2024

(30) Foreign Application Priority Data

Apr. 12, 2023 (KR) ........................ 10-2023-0048412

(51) Int. Cl.
*G09G 3/3233* (2016.01)

(52) U.S. Cl.
CPC ... *G09G 3/3233* (2013.01); *G09G 2300/0426* (2013.01); *G09G 2300/043* (2013.01); *G09G 2300/0819* (2013.01); *G09G 2300/0852* (2013.01); *G09G 2300/0861* (2013.01); *G09G 2310/08* (2013.01); *G09G 2320/02* (2013.01)

(58) Field of Classification Search
None
See application file for complete search history.

(56) References Cited

U.S. PATENT DOCUMENTS

| | | | | |
|---|---|---|---|---|
| 8,436,793 B2 | 5/2013 | Yamamoto | | |
| 2016/0104427 A1* | 4/2016 | Matsueda | G09G 3/3233 345/212 | |
| 2018/0137818 A1 | 5/2018 | Kim et al. | | |
| 2018/0308427 A1* | 10/2018 | Zhang | G09G 3/3233 | |
| 2020/0286432 A1* | 9/2020 | Zhang | G09G 3/3258 | |
| 2021/0327988 A1* | 10/2021 | Park | H10K 59/131 | |
| 2022/0173189 A1* | 6/2022 | Kim | G09G 3/325 | |
| 2023/0008511 A1 | 1/2023 | Son et al. | | |
| 2023/0112488 A1* | 4/2023 | Yang | G09G 3/3233 345/204 | |
| 2023/0326399 A1* | 10/2023 | Lee | G09G 3/32 | |
| 2024/0087519 A1* | 3/2024 | Kim | G09G 3/3266 | |

FOREIGN PATENT DOCUMENTS

| | | |
|---|---|---|
| CN | 115512656 | 12/2022 |
| KR | 10-2018-0055023 | 5/2018 |
| KR | 10-2022-0107797 | 8/2022 |
| KR | 10-2023-0009258 | 1/2023 |

* cited by examiner

*Primary Examiner* — Dorothy Harris
(74) *Attorney, Agent, or Firm* — KILE PARK REED & HOUTTEMAN PLLC

(57) ABSTRACT

Provided herein is a sub-pixel including first to seventh transistors, first and second capacitors, and a light emitting element, and a display device including the sub-pixel. A body terminal of the first transistor is connected to a first power line. In the sub-pixel and the display device including the sub-pixel in accordance with embodiments of the present disclosure, mitigation of the body effect may lead to an improvement in display quality.

19 Claims, 21 Drawing Sheets

<Logic level of GW, GI, GB, GC, EM1, and EM2>

SUB-PIXEL AND DISPLAY DEVICE INCLUDING THE SAME

CROSS-REFERENCE TO RELATED APPLICATION(S)

This application claims priority to and benefits of Korean patent application number 10-2023-0048412 under 35 U.S.C. § 119, filed on Apr. 12, 2023, in the Korean Intellectual Property Office (KIPO), the entire contents of which are incorporated herein by reference.

BACKGROUND

1. Technical Field

Various embodiments of the disclosure relate to a sub-pixel and a display device including the sub-pixel.

2. Description of Related Art

With the development of information technology, the importance of a display device, which is a connection medium between a user and information, has been emphasized. Owing to the importance of display devices, the use of various kinds of display devices, such as a liquid crystal display device and an organic light-emitting display device, has increased.

SUMMARY

Various embodiments of the disclosure are directed to a sub-pixel and a display device including the sub-pixel, which may mitigate body effect.

According to an embodiment of the disclosure, a sub-pixel may include a light emitting element including a first electrode, a second electrode, and an emission layer provided between the first electrode and the second electrode; a first transistor including a gate terminal electrically connected to a first node, a drain terminal electrically connected to a second node, a body terminal to which a first power voltage is applied, and a source terminal; a second transistor that switches electrical connection between a third node and a data line to which a data voltage is applied; a third transistor that switches electrical connection between the first node and the second node; a fourth transistor that switches electrical connection between the second node and the first electrode of the light emitting element; a fifth transistor that is electrically connected to the first electrode of the light emitting element, and supplies an initialization voltage to the first electrode of the light emitting element; a sixth transistor that applies a reference voltage to the third node in response to a scan signal; a seventh transistor that switches electrical connection between the source terminal of the first transistor and a first power line to which the first power voltage is applied; a first capacitor including a first electrode connected to the first node, and a second electrode connected to the third node; and a second capacitor including a first electrode connected to the first node, and a second electrode to which the reference voltage is applied.

At least one of the first to the seventh transistors may include a field-effect transistor including a P-channel metal oxide semiconductor.

At least one of the first to the seventh transistors may be formed on a silicon substrate.

The second electrode of the light emitting element may be electrically connected to a second power line to which a second power voltage is applied. A sum of the initialization voltage and a threshold voltage of the fifth transistor may be less than a sum of the second power voltage and a threshold voltage of the light emitting element.

The reference voltage may be higher than the initialization voltage, and may be lower than the first power voltage.

The first transistor may be electrically connected to the seventh transistor on a fourth node. The sub-pixel may further include a connection electrode electrically connected to the first transistor and the seventh transistor on the fourth node. The connection electrode may extend in a direction toward another sub-pixel adjacent to the sub-pixel.

According to an embodiment of the disclosure, a display device may include a display panel on which a plurality of sub-pixels are disposed, a plurality of data lines electrically connected to the plurality of sub-pixels and extending in a first direction are disposed, and a plurality of scan lines and a plurality of emission lines electrically connected to the plurality of sub-pixels and extending in a second direction are disposed; a data driving circuit that supplies data voltage to the plurality of data lines; a scan driving circuit that supplies a first scan signal, a second scan signal, a third scan signal, and a fourth scan signal to the plurality of scan lines; and a power supplying circuit that supplies a first power voltage, a second power voltage, a third power voltage, and a fourth power voltage to the plurality of sub-pixels. One of the plurality of sub-pixels may include: a light emitting element including a first electrode, a second electrode, and an emission layer provided between the first electrode and the second electrode; a first transistor including a gate terminal electrically connected to a first node, a drain terminal electrically connected to a second node, a body terminal to which a first power voltage is applied, and a source terminal; a second transistor that receives the data voltage in response to the first scan signal, and switches electrical connection between a third node and a corresponding one of the plurality of data lines to which the data voltage is applied; a third transistor that switches electrical connection between the first node and the second node; a fourth transistor that switches electrical connection between the second node and the first electrode of the light emitting element; a fifth transistor that is electrically connected to the first electrode of the light emitting element, and supplies third power voltage to the first electrode of the light emitting element; a sixth transistor that applies the fourth power voltage to the third node in response to the second scan signal; a seventh transistor that switches electrical connection between the source terminal of the first transistor and a first power line to which the first power voltage is applied; a first capacitor including a first electrode connected to the first node, and a second electrode connected to the third node; and a second capacitor including a first electrode connected to the first node, and a second electrode to which the fourth power voltage is applied.

The second electrode of the light emitting element may be electrically connected to a second power line to which the second power voltage is applied. The power supplying circuit may supply the third power voltage set such that a sum of the third power voltage and a threshold voltage of the fifth transistor is less than a sum of the second power voltage and a threshold voltage of the light emitting element.

The power supplying circuit may supply the fourth power voltage having a voltage level higher than the third power voltage and less than the first power voltage.

The second transistor may be controlled in response to the first scan signal, the sixth transistor is controlled in response to the second scan signal, the fifth transistor may be controlled in response to the third scan signal, and the third transistor may be controlled in response to the fourth scan signal.

During one frame period, a length of a period in which the scan driving circuit applies a turn-on level of the first scan signal to the plurality of sub-pixels may be less than a length of a period in which the scan driving circuit applies a turn-on level of the second scan signal to the plurality of sub-pixels, and the length of the period in which the scan driving circuit applies the turn-on level of the second scan signal to the plurality of sub-pixels may be less than a length of a period in which the scan driving circuit applies a turn-on level of the third scan signal to the plurality of sub-pixels.

During one frame period, a length of a period in which the scan driving circuit applies a turn-on level of the first scan signal to the plurality of sub-pixels, a length of a period in which the scan driving circuit applies a turn-on level of the second scan signal to the plurality of sub-pixels, and a length of a period in which the scan driving circuit applies a turn-on level of the fourth scan signal to the plurality of sub-pixels may be identical to each other, and a length of a period in which the scan driving circuit applies a turn-on level of the third scan signal to the plurality of sub-pixels may be greater than the length of the period in which the scan driving circuit applies the first, the second, and the fourth scan signals to the plurality of sub-pixels.

The display device may further include an emission driving circuit that supplies a first emission signal and a second emission signal to the plurality of emission lines. The fourth transistor may be controlled in response to the first emission signal, and the seventh transistor may be controlled in response to the second emission signal.

During one frame period, a length of a period in which the emission driving circuit applies a turn-off level of the first emission signal to the plurality of sub-pixels may be identical to a length of a period in which the emission driving circuit applies a turn-off level of the second emission signal to the plurality of sub-pixels, and the length of the period in which the emission driving circuit applies a turn-off level of the second emission signal to the plurality of sub-pixels may be identical to a length of a period in which the emission driving circuit applies a turn-on level of the first emission signal to the plurality of sub-pixels.

During one frame period, a length of a period in which the emission driving circuit applies a turn-off level of the first emission signal to the plurality of sub-pixels may be identical to a length of a period in which the emission driving circuit applies a turn-off level of the second emission signal to the plurality of sub-pixels, and the length of the period in which the emission driving circuit applies a turn-off level of the second emission signal to the plurality of sub-pixels may be greater than a length of a period in which the scan driving circuit applies a turn-on level of the first, the second, and the fourth scan signals to the plurality of sub-pixels, and may be less than a length of a period in which the scan driving circuit applies a turn-on level of the third scan signal to the plurality of sub-pixels.

One frame period may include a first period, a second period, a third period, a fourth period, and a fifth period. During the first period, the scan driving circuit may apply a turn-off level of the first scan signal, a turn-on level of the second scan signal, a turn-on level of the third scan signal, and a turn-off level of the fourth scan signal to the plurality of sub-pixels, and the emission driving circuit may apply a turn-on level of the first emission signal and a turn-off level of the second emission signal to the plurality of sub-pixels. During the second period, the scan driving circuit may apply the turn-off level of the first scan signal, the turn-on level of the second scan signal, the turn-on level of the third scan signal, and a turn-on level of the fourth scan signal to the plurality of sub-pixels, and the emission driving circuit may apply the turn-on level of the first emission signal and the turn-off level of the second emission signal to the plurality of sub-pixels. During the third period, the scan driving circuit may apply a turn-on level of the first scan signal, a turn-off level of the second scan signal, the turn-on level of the third scan signal, and the turn-on level of the fourth scan signal to the plurality of sub-pixels, and the emission driving circuit may apply a turn-off level of the first emission signal and a turn-on level of the second emission signal to the plurality of sub-pixels. During the fourth period, the scan driving circuit may apply the turn-off level of the first scan signal, the turn-on level of the second scan signal, the turn-on level of the third scan signal, and the turn-off level of the fourth scan signal to the plurality of sub-pixels, and the emission driving circuit may apply the turn-on level of the first emission signal and the turn-on level of the second emission signal to the plurality of sub-pixels. During the fifth period, the scan driving circuit may apply the turn-off level of the first scan signal, the turn-on level of the second scan signal, the turn-off level of the third scan signal, and the turn-off level of the fourth scan signal to the plurality of sub-pixels, and the emission driving circuit may apply the turn-on level of the first emission signal and the turn-on level of the second emission signal to the plurality of sub-pixels.

One frame period may include a first period, a second period, a third period, a fourth period, a fifth period, and a sixth period. During the first period, the scan driving circuit may apply a turn-off level of the first scan signal, a turn-off level of the second scan signal, a turn-on level of the third scan signal, and a turn-off level of the fourth scan signal to the plurality of sub-pixels, and the emission driving circuit may apply a turn-on level of the first emission signal and a turn-off level of the second emission signal to the plurality of sub-pixels. During the second period, the scan driving circuit may apply the turn-off level of the first scan signal, a turn-on level of the second scan signal, the turn-on level of the third scan signal, and a turn-on level of the fourth scan signal to the plurality of sub-pixels, and the emission driving circuit may apply the turn-on level of the first emission signal and the turn-off level of the second emission signal to the plurality of sub-pixels. During the third period, the scan driving circuit may apply the turn-off level of the first scan signal, the turn-on level of the second scan signal, the turn-on level of the third scan signal, and the turn-on level of the fourth scan signal to the plurality of sub-pixels, and the emission driving circuit may apply a turn-off level of the first emission signal and a turn-on level of the second emission signal to the plurality of sub-pixels. During the fourth period, the scan driving circuit may apply a turn-on level of the first scan signal, the turn-off level of the second scan signal, the turn-on level of the third scan signal, and the turn-off level of the fourth scan signal to the plurality of sub-pixels, and the emission driving circuit may apply the turn-off level of the first emission signal and the turn-on level of the second emission signal to the plurality of sub-pixels. During the fifth period, the scan driving circuit may apply the turn-on level of the first scan signal, the turn-off level of the second scan signal, the turn-on level of the third scan signal, and the turn-off level of the fourth scan signal to the plurality of sub-pixels, and the emission driving circuit may apply the turn-on level of the first emission signal and the turn-off level of the second emission signal to the plurality of sub-pixels. During the sixth period, the scan driving circuit may apply the turn-off level of the first to the fourth scan signals to the plurality of sub-pixels, and the emission driving circuit may apply the turn-on level of the first and the second emission signals to the plurality of sub-pixels.

Another sub-pixel disposed adjacent to one of the plurality of sub-pixels may include a connection electrode. The connection electrode may be electrically connected to the first transistor and the seventh transistor on a fourth node.

The one of the plurality of sub-pixels and the another sub-pixel may share the seventh transistor.

DETAILED DESCRIPTION OF THE EMBODIMENTS

Figure 1:
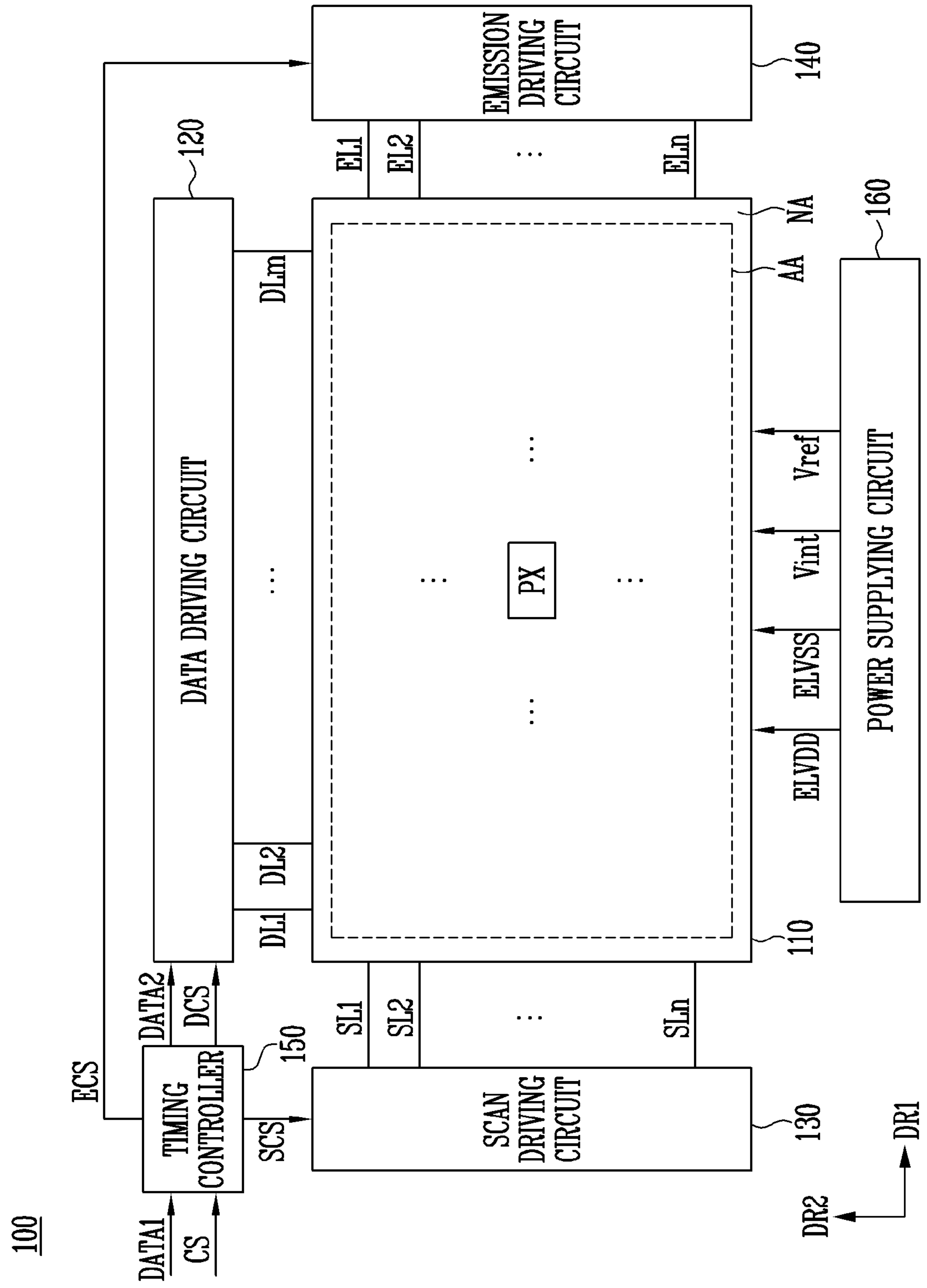
FIG. 1 is a schematic system block diagram of a display device in accordance with embodiments of the disclosure.

Hereinafter, embodiments of the disclosure will be described in detail with reference to the attached drawings, such that those skilled in the art can readily implement the disclosure. The disclosure may be implemented in various forms, and is not limited to the embodiments to be described herein below.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals and/or reference characters denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Furthermore, the expression "being the same" may mean "being substantially the same". In other words, the expression "being the same" may include a range that can be tolerated by those skilled in the art. The other expressions may also be expressions from which "substantially" has been omitted.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element. In the disclosure, the singular forms are intended to include the plural forms as well, unless the context clearly indicates otherwise.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which the disclosure belongs. Furthermore, terms as defined in a commonly used dictionary should be construed as having the same meaning as in an associated technical context, and unless defined apparently in the description, the terms are not ideally or excessively construed as having formal meaning.

Hereinafter, embodiments of the disclosure will be described in detail with reference to the attached drawings.

FIG. 1 is a schematic system block diagram illustrating a display device 100 in accordance with embodiments of the disclosure.

Referring to FIG. 1, the display device 100 in accordance with embodiments of the disclosure may include a display panel 110, a data driving circuit 120, a scan driving circuit 130, an emission driving circuit 140, a timing controller 150, and a power supplying circuit 160.

Multipole pixels PX may be disposed in the display panel 110. Electrically connected to the pixels PX, multiple data lines DL1, DL2, . . . , DLm (where m is an integer of 2 or more), multiple scan lines SL1, SL2, . . . , SLn (where n is an integer of 2 or more), and multiple emission lines EL1, EL2, . . . , ELn may be disposed in the display panel 110. One or more common voltage lines configured to apply common voltages (e.g., a first common voltage ELVDD, a second common voltage ELVSS, a third common voltage Vint, and a fourth common voltage Vref) to the pixels PX may be disposed on the display panel 110.

The display panel 110 may include a display area AA in which multiple pixels PX are disposed, and a non-display area NA positioned in a peripheral area of the display area AA (e.g., an edge area of the display area AA).

The display panel 110 may be formed to be planar, but is not limited thereto. For example, the display panel 110 may include a curved surface portion (not illustrated) formed on each of left and right ends of the display panel 110. The curved surface may have a constant curvature or a variable curvature. The display panel 110 may be formed to be flexible so that the display panel 110 can be bent, curved, folded, or rolled.

The pixels PX may be disposed in the display area AA. The pixels PX may include two or more sub-pixels. For example, the sub-pixels may be arranged in a matrix structure, or may be arranged in a PENTILE™ structure or the like. However, embodiments of the disclosure are not limited to the foregoing structures.

The scan lines SL1 to SLn may be disposed in the display panel 110 and extend in a first direction DR1. The first direction DR1 may be, for example, a direction from the left to the right on the display panel 110.

The emission lines EL1 to E1*n* may be disposed in the display panel 110 and extend in the first direction DR1.

The data lines DL1 to DLm may be disposed in the display panel 110 and extend in a second direction DR2. The second direction DR2 may be a direction different from the first direction DR1. For example, the second direction DR2 may be a direction perpendicular to the first direction DR1. The second direction DR2 may be, for example, a direction from a lower side to an upper side of the display panel 110.

The data driving circuit 120 may supply data voltages to the data lines DL1 to DLm. The data driving circuit 120 may generate data voltages based on input image data DATA2 and a data driving circuit control signal DCS, and output the generated data voltages to the data lines DL1 to DLm at correct timings. The data driving circuit control signal DCS may include, for example, a source start pulse (SSP), a source shift clock (SSC), a source output enable (SOE), and the like.

The data driving circuit 120 may be implemented as an integrated circuit (e.g., a source driver integrated circuit (SDIC)) formed separately from the display panel 110, or may be integral with the display panel 110 and disposed in at least a portion of the non-display area NA of the display panel 110. In an embodiment, at least a portion of the data driving circuit 120 may be disposed in the display area AA of the display panel 110.

The scan driving circuit 130 may output scan signals to the scan lines SL1 to SLn, in response to a scan driving circuit control signal SCS. For example, the scan driving circuit control signal SCS may include a start signal instructing a frame to start, a horizontal synchronization signal for outputting a scan signal at a correct timing at which a data voltage is applied, and the like.

The scan driving circuit 130 may be implemented as an integrated circuit (e.g., a gated driver integrated circuit (GDIC)) formed separately from the display panel 110, or may be integral with the display panel 110 and disposed in at least a portion of the non-display area NA of the display panel 110. In an embodiment, at least a portion of the scan driving circuit 130 may be disposed in the display area AA.

The emission driving circuit 140 may output emission signals to the emission lines EL1 to E1*n*, in response to an emission driving circuit control signal ECS. For example, the emission driving circuit control signal ECS may include a start signal, a horizontal synchronization signal, and the like.

The emission driving circuit 140 may be implemented as an integrated circuit formed separately from the display panel 110, or may be integral with the display panel 110 and disposed in at least a portion of the non-display area NA of the display panel 110. In an embodiment, at least a portion of the emission driving circuit 140 may be disposed in the display area AA.

The timing controller 150 may control the data driving circuit 120, the scan driving circuit 130, and the emission driving circuit 140. The timing controller 150 may receive a control signal CS (e.g., a synchronization signal, a clock signal, or the like) from an external device (e.g., a host system, a set-top box, an application processor (AP), or the like). The timing controller 150 may generate and output control signals DCS, SCS, and ECS for controlling the data driving circuit 120, the scan driving circuit 130, and the emission driving circuit 140, based on the received control signal CS.

The timing controller 150 may receive original image data DATA1 from an external device (e.g., a host system, a set-top box, an application processor, or the like), and align the input original image data DATA1 on a pixel row basis. The timing controller 150 may convert the input original image data DATA1 to data corresponding to a preset interface (e.g., a low voltage differential signaling (LVDS), an embedded display port (eDP), or the like). The input image data DATA2 which is output from the timing controller 150 to the data driving circuit 120 may be data obtained as a result of the conversion in the timing controller 150 according to the preset interface.

The timing controller 150 may be disposed in the display device 100 in the form of logic circuit or a processor. The timing controller 150 may include at least one register.

The timing controller 150 may receive the original image data DATA1 and the control signal CS from an external device (e.g., a host system or the like) through an interface such as a serial programming interface (SPI), an inter integrated circuit (I2C), or a mobile industry processor interface (MIPI).

The power supplying circuit 160 may supply a voltage. For example, the power supplying circuit 160 may output a constant voltage having a constant voltage level. The power supplying circuit 160 may output, for example, a first power voltage ELVDD, a second power voltage ELVSS, a third power voltage Vint, and a fourth power voltage Vref the display panel 110. The power supplying circuit 160 may be implemented, for example, as a power management integrated circuit (PMIC).

In FIG. 1, the driving circuits 120, 130, 140, 150, and 160 configured to supply signals, voltages, or the like to the display panel 110 may be distinguished from each other only according to the function. For example, the data driving circuit 120 and the timing controller 150 may be formed in a single integrated circuit. The data driving circuit 120 and the timing controller 150 may be distinguished from each other according to the function in a single integrated circuit in the display device 100.

The display device 100 in accordance with embodiments of the disclosure may be used not only as portable electronic devices such as a mobile phone, a smart phone, a tablet personal computer (a tablet PC), a smart watch, a watch phone, a mobile communication terminal, an electronic notebook, an electronic book, a portable multimedia player (PMP), a navigation device, and an ultra mobile personal computer (UMPC), but also as display screens of various products such as a television, a notebook, a monitor, an advertisement panel, and an internet of tings (IoT). The display device 100 in accordance with embodiments of the disclosure may be used as a display screen for virtual reality (VR) devices, augmented reality (AR) devices, and the like.

In case that the display device 100 is used as a display screen for VR devices, AR devices, and the like, the display device 100 may be positioned very close to the eyes of a user. In case that the display device 100 is used as a display screen for VR devices, AR devices, and the like, the display device 100 may have a high pixel density. According to an embodiment, to increase the pixel density, the pixels PX may be formed on a silicon substrate. The technology of forming pixel circuits and associated light emitting elements (e.g., organic light emitting diodes (OLED)) on the silicon substrate may be referred to as OLEDoS (OLED on Silicon).

Figure 2:
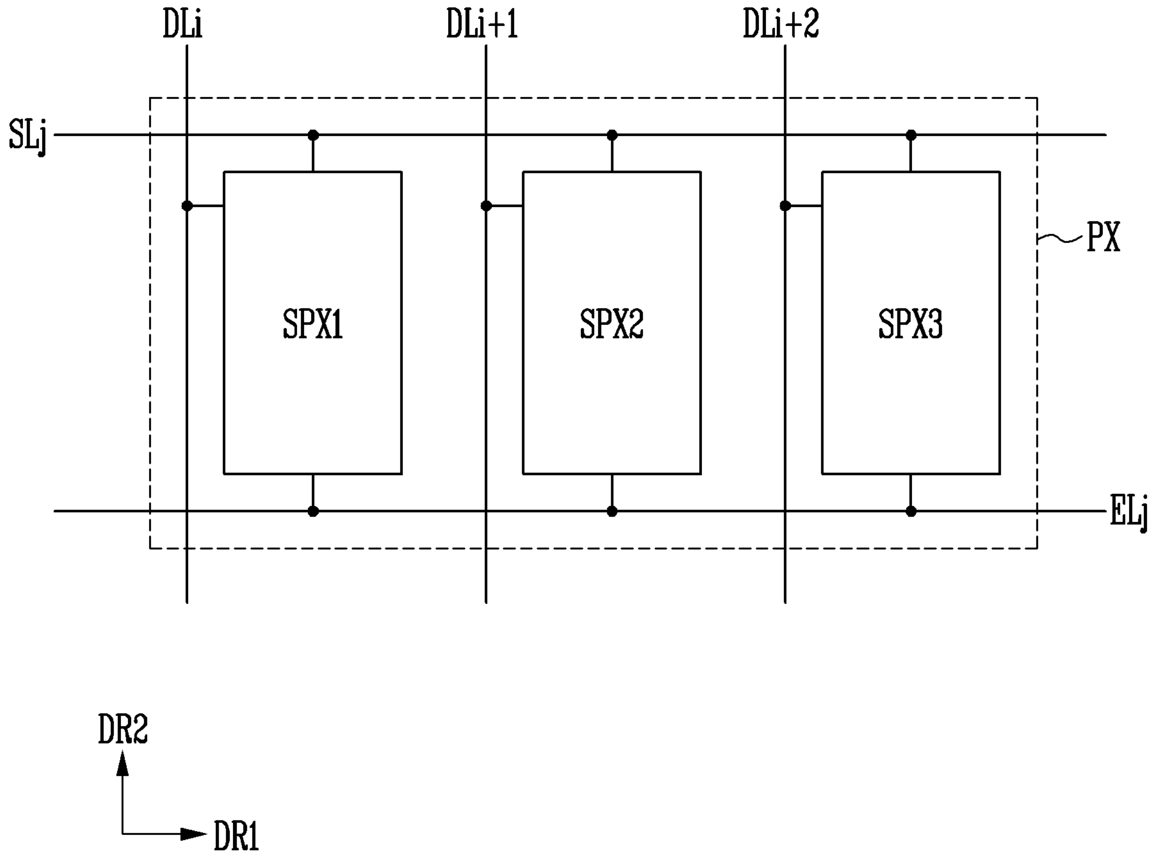
FIG. 2 a schematic diagram of a pixel in accordance with embodiments of the disclosure.

FIG. 2 a schematic diagram of the pixel PX in accordance with embodiments of the disclosure.

The pixel PX may include multiple sub-pixels SPX1, SPX2, and SPX3, as illustrated in FIG. 2. Although FIG. 2 illustrates that the pixel PX includes three sub-pixels SPX1, SPX2, and SPX3, i.e., a first sub-pixel SPX1, a second sub-pixel SPX2, and a third sub-pixel SPX3, embodiments of the disclosure are not limited thereto.

Each of the first sub-pixel SPX1, the second sub-pixel SPX2, and the third sub-pixel SPX3 may be electrically connected to one of the data lines DLi, DLi+1, and DLi+2. Each of the first sub-pixel SPX1, the second sub-pixel SPX2, and the third sub-pixel SPX3 may be electrically connected to one of the scan lines SLj. Each of the first sub-pixel SPX1, the second sub-pixel SPX2, and the third sub-pixel SPX3 may be electrically connected to at least one of the emission lines ELj. For example, referring to FIG. 2, the first sub-pixel SPX1 may be electrically connected to an i-th data line DLi, a j-th scan line SLj, and a j-th emission line ELj. The second sub-pixel SPX2 may be electrically connected to an i+1-th data line DLi+1, the j-th scan line SLj, and the j-th emission line ELj. The third sub-pixel SPX3 may be electrically connected to an i+2-th data line DLi+2, the j-th scan line SLj, and the j-th emission line ELj.

Each of the first sub-pixel SPX1, the second sub-pixel SPX2, and the third sub-pixel SPX3 may have a rectangular shape, a square shape, or a rhombus shape, in a plan view. For example, each of the first sub-pixel SPX1, the second sub-pixel SPX2, and the third sub-pixel SPX3 may have a rectangular planar shape having short sides extending in the first direction DR1 and long sides extending in the second direction DR2, as illustrated in FIG. 2.

At least two of the first sub-pixel SPX1, the second sub-pixel SPX2, and the third sub-pixel SPX3 may be arranged in line in the first direction DR1. For example, as illustrated in FIG. 2, the first sub-pixel SPX1, the second sub-pixel SPX2, and the third sub-pixel SPX3 may be arranged in line in the first direction DR1. In another embodiment, the first sub-pixel SPX1 and one of the second sub-pixel SPX2 and the third sub-pixel SPX3 may be arranged in the first direction DR1, and a remaining one and the first sub-pixel SPX1 may be arranged in the second direction DR2. In another embodiment, the second sub-pixel SPX2 and one of the first sub-pixel SPX1 and the third sub-pixel SPX3 may be arranged in the first direction DR1, and a remaining one and the second sub-pixel SPX2 may be arranged in the second direction DR2. However, embodiments of the disclosure are not limited to the foregoing example.

The first sub-pixel SPX1 may emit light in a first wavelength band. The second sub-pixel SPX2 may emit light in a second wavelength band. The third sub-pixel SPX3 may emit light in a third wavelength band. The light in the first wavelength band may be light in a red wavelength band. The light in the second wavelength band may be light in a green wavelength band. The light in the third wavelength band may be light in a blue wavelength band. The red wavelength band may be a wavelength band in a range of approximately 600 nm to approximately 750 nm. The green wavelength band may be a wavelength band in a range of approximately 480 nm to approximately 560 nm. The blue wavelength band may be a wavelength band in a range of approximately 370 nm to approximately 460 nm. However, embodiments of the disclosure are not limited to the foregoing.

Each of the first sub-pixel SPX1, the second sub-pixel SPX2, and the third sub-pixel SPX3 may include a light emitting element configured to emit light. For example, each of the first sub-pixel SPX1, the second sub-pixel SPX2, and the third sub-pixel SPX3 may include an organic light emitting diode (OLED) as a light emitting element, but embodiments of the disclosure are not limited thereto.

Figure 3:
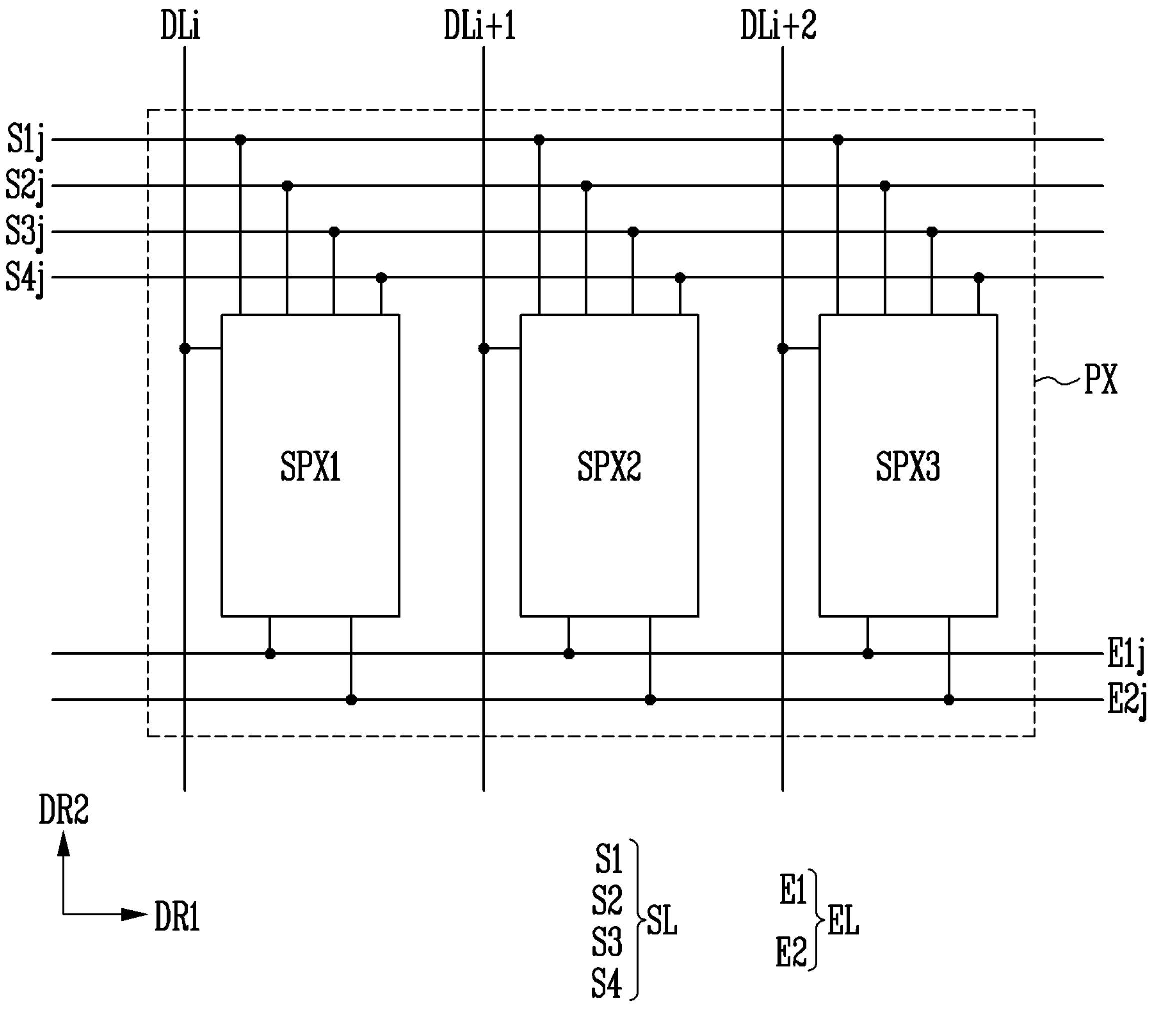
FIG. 3 is a schematic diagram of the pixel of FIG. 2 in accordance with embodiments of the disclosure.

FIG. 3 is a schematic diagram of the pixel PX of FIG. 2 in accordance with embodiments of the disclosure.

Referring to FIG. 3, the pixel PX in accordance with embodiments of the disclosure may include a first sub-pixel SPX1, a second sub-pixel SPX2, and a third sub-pixel SPX3.

Each of the first to third sub-pixels SPX1 to SPX3 may be electrically connected to a first scan line S1, a second scan line S2, a third scan line S3, and a fourth scan line S4. Each of the first to third sub-pixels SPX1 to SPX3 may be electrically connected to the first emission line E1 and the second emission line E2.

For example, referring to FIG. 3, the first sub-pixel SPX1 may be electrically connected to the i-th data line DLi, j-th first to fourth scan lines S1*j* to S4*j*, and j-th first and second emission lines E1*j* and E2*j*. The second sub-pixel SPX2 may be electrically connected to the i+1-th data line DLi+1, the j-th first to fourth scan lines S1*j* to S4*j*, and the j-th first and second emission lines E1*j* and E2*j*. The third sub-pixel SPX3 may be electrically connected to the i+2-th data line DLi+2, the j-th first to fourth scan lines S1*j* to S4*j*, and the j-th first and second emission lines E1*j* and E2*j*.

Figure 4:
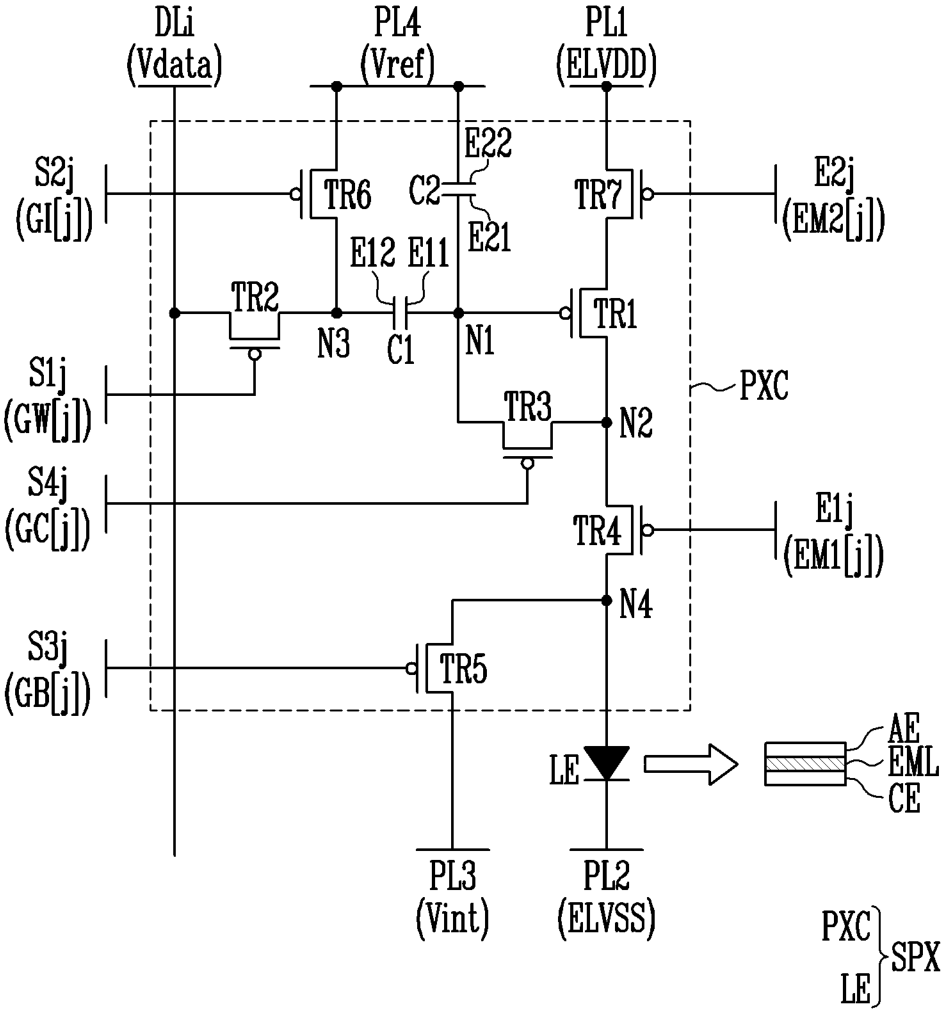
FIG. 4 is a schematic diagram of an equivalent circuit of a sub-pixel in accordance with embodiments of the disclosure.

FIG. 4 is a schematic diagram of an equivalent circuit of a sub-pixel SPX in accordance with embodiments of the disclosure.

The sub-pixel SPX in accordance with embodiments of the disclosure may include a pixel circuit PXC and a light emitting element LE. The pixel circuit PXC may include one or more switching elements (e.g., transistors), and one or more storage elements (e.g., capacitors).

The sub-pixel SPX illustrated in FIG. 4 may be electrically connected to the i-th data line DLi, the j-th first to fourth scan lines S1*j* to S4*j*, and the j-th first and second emission lines E1*j* and E2*j*. The sub-pixel SPX may correspond to the first sub-pixel SPX1 described with reference to FIG. 3.

Referring to FIG. 4, the pixel circuit PXC in accordance with embodiments of the disclosure may include first to seventh transistors TR1 to TR7 and first and second capacitors C1 and C2.

Each of the first to seventh transistors TR1 to TR7 may include a gate electrode, a source electrode, a drain electrode, and a body electrode. The first power voltage ELVDD may be applied to the body electrode of each of the first to seventh transistors TR1 to TR7.

The first transistor TR1 may generate current (e.g., driving current) flowing through the light emitting element LE. The first transistor TR1 may provide current (e.g., driving current) corresponding to a voltage applied to a first node N1. The first transistor TR1 may include a gate electrode electrically connected to the first node N1, a first electrode (e.g., a drain electrode) electrically connected to a second node N2, and a second electrode (e.g., a source electrode) to which the first power voltage ELVDD or a voltage corresponding thereto is applied.

The second transistor TR2 may switch electrical connection between the data line DLi and a third node N3 in response to a first scan signal GW[j]. The first scan signal GW[j] may be applied to the first scan line S1*j*. The second transistor TR2 may be turned on in response to a turn-on level of the first scan signal GW[j]. In case that the second transistor TR2 is turned on, a data voltage Vdata may be applied to the third node N3.

The third transistor TR3 may switch electrical connection between the first node N1 and the second node N2. The third transistor TR3 may switch the electrical connection between the first node N1 and the second node N2 in response to a fourth scan signal GC[j]. The fourth scan signal GC[j] may be applied to the fourth scan line S4*j*. The third transistor TR3 may electrically connect the first node N1 and the second node N2 to each other in response to a turn-on level of the fourth scan signal GC[j]. In case that the third transistor TR3 is turned on, the first transistor TR1 may be connected in a diode form.

The fourth transistor TR4 may switch electrical connection between the second node N2 and a fourth node N4. The fourth transistor TR4 may switch the electrical connection between the second node N2 and the fourth node N4 in response to a first emission signal EM1[*j*]. The first emission signal EM1[*j*] may be applied to the first emission line E1*j*. The fourth transistor TR4 may electrically connect the second node N2 and the fourth node N4 to each other in response to a turn-on level of the first emission signal EM1[*j*].

The fifth transistor TR5 may switch electrical connection between the fourth node N4 and a third power line PL3. The fifth transistor TR5 may switch the electrical connection between the fourth node N4 and the third power line PL3 in response to a third scan signal GB[j]. The third scan signal GB[j] may be applied to the third scan line S3*j*. The third power voltage Vint may be applied to the third power line PL3. The third power voltage Vint may be an initialization voltage. The fifth transistor TR5 may electrically connect the fourth node N4 and the third power line PL3 to each other in response to a turn-on level of the third scan signal GB[j].

The sixth transistor TR6 may switch electrical connection between the third node N3 and a fourth power line PL4. The sixth transistor TR6 may electrically connect the third node N3 and the fourth power line PL4 to each other in response to a second scan signal GI[j]. The second scan signal GI[j] may be applied to the second scan line S2*j*. The fourth power voltage Vref may be applied to the fourth power line PL4. The sixth transistor TR6 may electrically connect the third node N3 and the fourth power line PL4 in response to a turn-on level of the second scan signal GI[j].

The seventh transistor TR7 may switch electrical connection between a first power line PL1 and the first transistor TR1. The seventh transistor TR7 may switch the electrical connection between the first power line PL1 and the first transistor TR1 in response to a second emission signal EM2[*j*]. The second emission signal EM2[*j*] may be applied to the second emission line E2*j*. The first power voltage ELVDD may be applied to the first power supply line PL1. The seventh transistor TR7 may electrically connect the first power line PL1 and the first transistor TR1 to each other in response to a turn-on level of the second emission signal EM2[*j*].

The first capacitor C1 may maintain a difference in voltage between the first node N1 and the third node N3. The first capacitor C1 may include an electrode E11 which is electrically connected to the first node N1, and a counter electrode E12 which is electrically connected to the third node N3.

The second capacitor C2 may maintain a difference in voltage between the first node N1 and the fourth power line PL4. The second capacitor C2 may include an electrode E21 which is electrically connected to the first node N1, and a counter electrode E22 which is electrically connected to the fourth power line PL4.

The light emitting element LE may include a first electrode AE, a second electrode CE, and an emission layer EML. The emission layer EML may be located between the first electrode AE and the second electrode CE. The first electrode AE may be one of an anode electrode and a cathode electrode. The second electrode CE may be another one of the anode electrode and the cathode electrode. Although for convenience in the following description, an embodiment that the first electrode AE is an anode electrode and the second electrode CE is a cathode electrode is described, it should be understood that embodiments of the disclosure are not limited thereto.

The light emitting element LE may include a first electrode AE electrically connected to the fourth node N4, and a second electrode CE electrically connected to the second power line PL2. The second power voltage ELVSS may be applied to the second power supply line PL2. Current (e.g., driving current) having a magnitude corresponding to a voltage difference between a voltage of the fourth node N4 and the second power voltage ELVSS may flow through the light emitting element LE. The light emitting element LE may emit light at a luminance corresponding to a difference between the voltage of the fourth node N4 and the second power voltage ELVSS.

The emission layer EML may include high-molecular-weight or low-molecular-weight organic light emitting material. The emission layer EML may include inorganic light emitting material, or may include quantum dots. For example, the emission layer EML may include high-molecular-weight or low-molecular-weight organic light emitting material for emitting light in a wavelength band (e.g., a blue wavelength band, a green wavelength band, or a red wavelength band).

At least one of the transistors that form the pixel circuit PXC may include a P-type semiconductor layer. For example, at least one of the first to seventh transistors TR1 to TR7 may be implemented as a field effect transistor (FET) including a P-channel metal oxide semiconductor (PMOS). Although an embodiment that all of the first to seventh transistors TR1 to TR7 are implemented as field effect transistors including P-channel metal oxide semiconductors is described, embodiments of the disclosure are not limited thereto. For example, at least one of the first to seventh transistors TR1 to TR7 may be implemented as a field effect transistor (FET) including an N-channel metal oxide semiconductor (NMOS).

In an embodiment, the first to fourth scan signals GW[j], GI[j], GB[j], and GC[j] may be applied to a respective scan line. For example, the first to fourth scan lines S1*j* to S4*j* may be separate scan lines different from each other.

In an embodiment, at least two of the first to fourth scan signals GW[j], GI[j], GB[j], and GC[j] may be applied to a same scan line. For example, the second scan signal GI[j] and the fourth scan signal GC[j] may be applied to a same scan line, and the second scan line S2*j* and the fourth scan line S4*j* may be implemented as one scan line. However, the disclosure is not limited to the foregoing.

In an embodiment, one of the first to fourth scan signals GW[j], GI[j], GB[j], and GC[j] may be a signal, which is different only in phase from another one of the first to fourth scan signals GW[j], GI[j], GB[j], and GC[j]. For example, the first scan signal GW[j] and the second scan signal GI[j] may be different only in phase (e.g., has a delayed phase). For example, the first scan signal GW[j] and the fourth scan signal GC[j] may be different only in phase (e.g., has a delayed phase), and the design and fabrication of the scan driving circuit 130 (refer to FIG. 1) may be facilitated. However, the disclosure is not limited to the foregoing.

In an embodiment, the first and second emission signals EM1[*j*] and EM2[*j*] may be signals different from each other only in phase. For example, the first emission signal EM1[*j*] and the second emission signal EM2[*j*] may be different only in phase (e.g., has a delayed phase), and the design and fabrication of the emission driving circuit 140 (refer to FIG. 1) may be facilitated. However, the disclosure is not limited to the foregoing.

Figure 5:
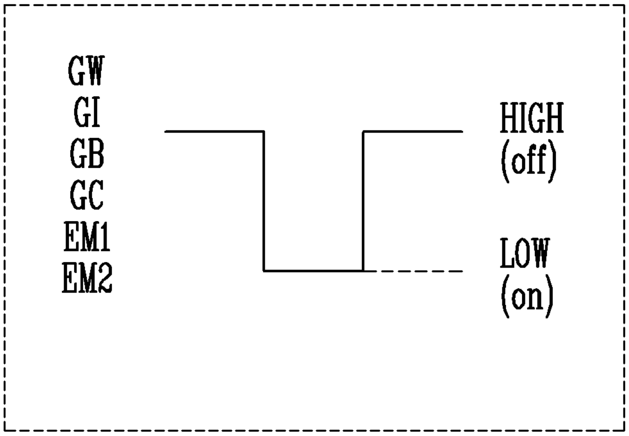
FIG. 5 illustrates scan signals and emission signals in accordance with embodiments of the disclosure.

FIG. 5 illustrates scan signals and emission signals in accordance with embodiments of the disclosure.

In embodiments of the disclosure, the scan signals may be first to fourth scan signals GW, GI, GB, and GC. The emission signals may be first and second emission signals EM1 and EM2. In embodiments of the disclosure, each scan signal may have a high logic level HIGH and a low logic level LOW. Each emission signal may have a high logic level HIGH and a low logic level LOW.

As a signal for controlling a transistor including a P-channel metal oxide semiconductor PMOS, the high logic level HIGH may correspond to a turn-off level (or a turn-off voltage level), and the low logic level LOW may correspond to a turn-on level (or a turn-on voltage level).

As a signal for controlling a transistor including an N-channel metal oxide semiconductor NMOS, the high logic level HIGH may correspond to a turn-on level (or a turn-on voltage level), and the low logic level LOW may correspond to a turn-off level (or a turn-off voltage level).

In embodiments of the disclosure, each of the first to seventh transistors TR1 to TR7 may include a P-channel metal oxide semiconductor. Although the first to fourth scan signals GW, GI, GB, and GC and the first and second emission signals EM1 and EM2 will be described below under the assumption that the high logic level HIGH corresponds to a turn-off level and the low logic level LOW corresponds to a turn-on level, embodiments of the disclosure are not limited thereto.

Figure 6:
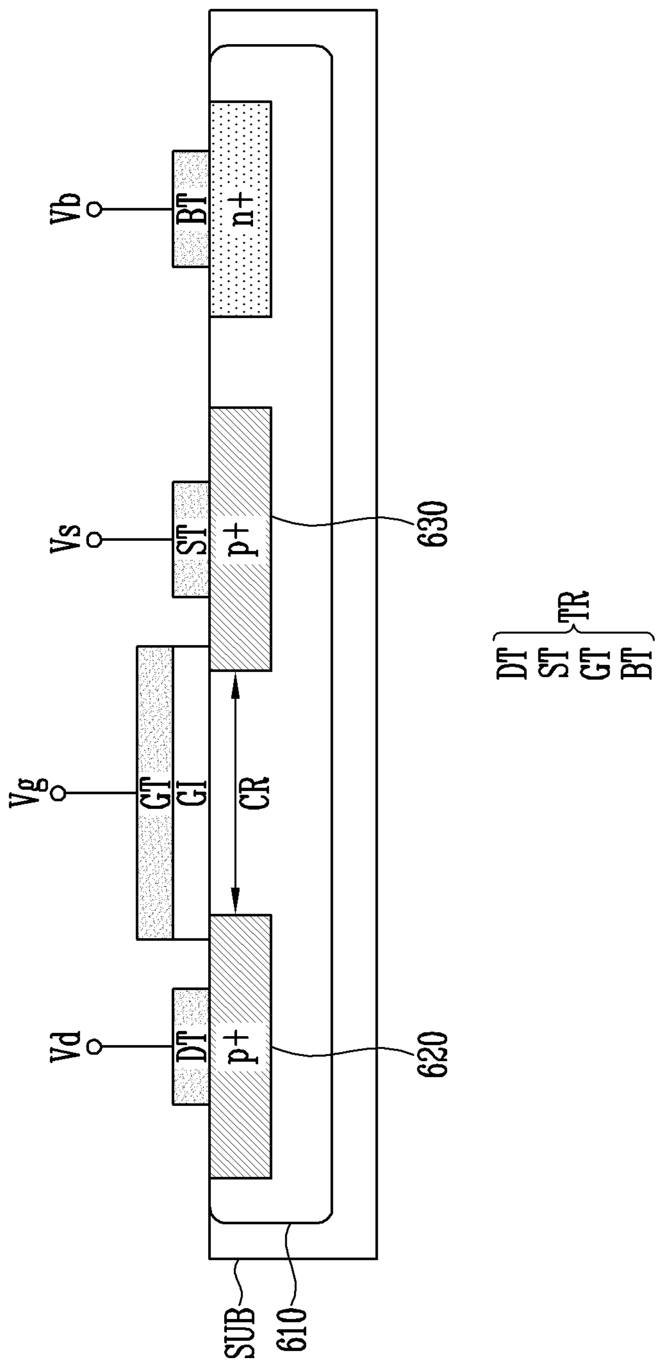
FIG. 6 is a schematic cross-sectional view of a field-effect transistor including a P-channel metal oxide semiconductor (PMOS).

FIG. 6 is a schematic cross-sectional view of a field-effect transistor including a P-channel metal oxide semiconductor (PMOS).

Referring to FIG. 6, a field-effect transistor (hereinafter, referred to simply as a transistor TR) including a metal oxide semiconductor may include a body terminal BT (or a body electrode BT), a source terminal ST (or a source electrode ST), a drain terminal DT (or a drain electrode DT), and a gate terminal GT (or a gate electrode GT). The transistor TR may be formed on the substrate SUB. For example, the substrate SUB may be a silicon substrate (e.g., a wafer) including silicon (Si).

P-type impurities (p+) (or P-type dopants (p+)) may be added to the substrate SUB. The substrate SUB may be doped with P-type impurities. An N-type well layer 610 may be formed on a surface of the substrate SUB doped with P-type impurities (p+).

A first doping area 620 and a second doping area 630 may be formed inside the N-type well layer 610. The first doping area 620 and the second doping area 630 each may be an area doped with P-type impurities (p+) by infiltrating the P-type impurities (p+) thereinto at a high concentration. The first doping area 620 and the second doping area 630 may be spaced apart from each other. The first doping area 620 and the second doping area 630 may be disposed adjacent to the gate terminal GT. In case that a turn-on level voltage is applied to the gate terminal GT, a channel is formed in a channel area CR between the first doping area 620 and the second doping area 630, and current may flow between the first doping are 620 and the second doping area 630. The first doping area 620 may be one of a source area or a drain area (e.g., the drain area). The second doping area 630 may be another one of the source area and the drain area (e.g., the source area). Although an embodiment that the first doping area 620 is a drain area of the transistor TR, and the second doping area 630 is a source area of the transistor TR is described, embodiments of the disclosure are not limited thereto.

The first doping area 620 may be connected to the drain terminal DT. The second doping area 630 may be connected to the source terminal ST. The gate terminal GT may overlap at least a portion of the first doping area 620 in a thickness direction of the substrate SUB. Each of the source terminal ST and the drain terminal DT may include a material having excellent conductivity. For example, each of the source terminal ST and the drain terminal DT may include a conductive material such as molybdenum (Mo), aluminum (Al), copper (Cu), titanium (Ti), or the like. Each of the source terminal ST and the drain terminal DT may have a single-layer structure or multilayer structure including the foregoing material. For example, each of the source terminal ST and the drain terminal DT may have a multilayer structure of Ti/Al/Ti.

The gate terminal GT may overlap at least a portion of the second doping area 630 in the thickness direction. The gate terminal GT may overlap the channel area CR in the thickness direction. A gate insulating layer GI may be positioned between the gate terminal GT and the substrate SUB. The gate electrode GT may include a low-resistance metal material. For example, the gate terminal GT may include a conductive material such as molybdenum (Mo), aluminum (Al), copper (Cu), titanium (Ti), or the like. The gate terminal GT may have a single-layer structure or multilayer structure including the foregoing material.

The gate insulating layer GI may electrically insulate the gate terminal GT from the first doping are 620, and may electrically insulate the gate terminal GT from the second doping area 630. The gate insulating layer GI may include an inorganic insulating material. For example, the gate insulating layer GI may include an inorganic insulating material such as silicon oxide ($SiO_2$), silicon nitride ($SiN_x$) (where x is a positive number), silicon oxynitride (SiON), aluminum oxide ($Al_2O_3$), titanium oxide ($TiO_2$), tantalum oxide ($Ta_2O_5$), hafnium oxide ($HfO_2$), and/or zinc oxide ($ZnO_2$).

An inner side of the N-type well layer 610 may be doped with N-type impurities (n+) (or N-type dopants (n+)). The body electrode BT may be connected to an area doped with N-type impurities (n+) (e.g., an area doped with N-type impurities (n+) at a high concentration).

A drain voltage Vd may be applied to the drain terminal DT. A source voltage Vs may be applied to the source terminal ST. A body voltage Vb may be applied to the body terminal BT. A gate voltage Vg may be applied to the gate terminal GT.

In a transistor TR including a P-type semiconductor, a constant voltage (e.g., a first power voltage ELVDD (refer to FIG. 4)) may be applied to the body terminal BT.

In case that the source voltage Vs changes during an operation period of the transistor TR (e.g., during a period in which the transistor TR is turned on), the threshold voltage of the transistor TR may change. This is the body effect of the transistor. According to the body effect, the threshold voltage Vth may change according to the source voltage Vs in accordance with the Equation 1 below.

$$|Vth| = |Vth0| + \gamma\left(\sqrt{2\phi_n - Vsb} - \sqrt{2\phi_n}\right) \quad \text{[Equation 1]}$$

In Equation 1, |Vth| may be an absolute value of the changed threshold voltage of the transistor. |Vth0| may be an absolute value of the threshold voltage of the transistor before change. Γ may be a constant value of the body effect, and may have a positive value. $\Phi_n$ may be an N-well surface potential, which may be a constant value. Vsb may be a value obtained by subtracting the body voltage Vb from the source voltage Vs.

According to Equation 1, in case that the source voltage Vs decreases while the body voltage Vb remains constant, the threshold voltage Vth of the transistor may increase.

Embodiments of the disclosure may provide a pixel and a display device including the pixel, capable of mitigating (e.g., minimizing) a variation of the threshold voltage of the transistor due to the body effect. For example, as described with reference to FIG. 4, the display quality may be improved by mitigating the variation of the threshold voltage due to the body effect of the first transistor TR1.

Hereinafter, embodiments of the disclosure will be described in more detail with reference to timing diagrams.

FIGS. 7, 8, 9, 10, 11, and 12 are schematic diagrams of equivalent circuits of the sub-pixel, and illustrate a method 700 of driving the display device including the sub-pixel in accordance with embodiments of the disclosure.

The sub-pixels in FIGS. 7-12 may correspond to the sub-pixel SPX in FIG. 4.

Figure 7:
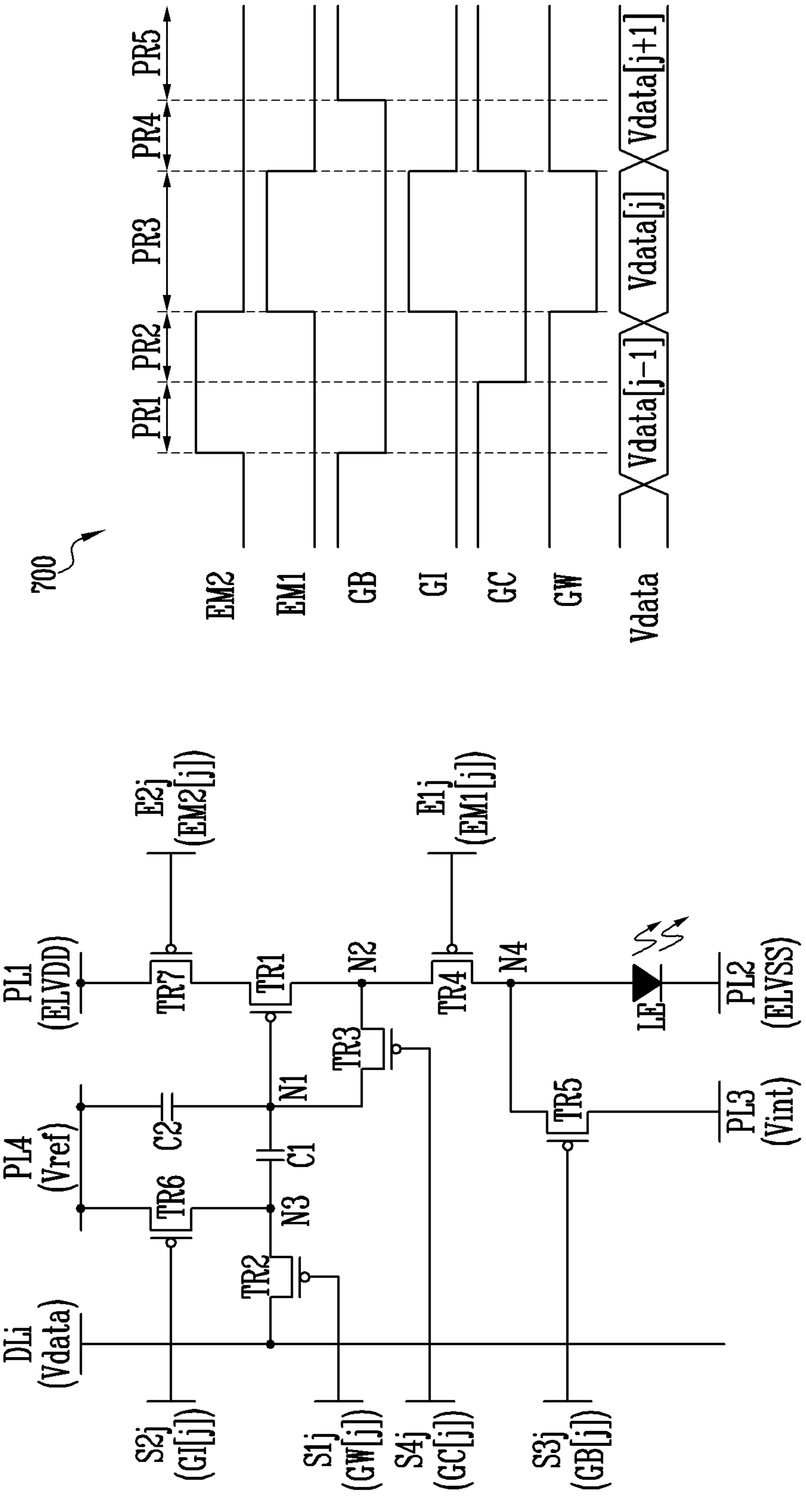
FIGS. 7, 8, 9, 10, 11, and 12 are schematic diagrams of equivalent circuits of the sub-pixel, and illustrate a method of driving a display device including the sub-pixel in accordance with embodiments of the disclosure.

Referring to FIG. 7, the method 700 of driving the display device may include a first period PR1, a second period PR2, a third period PR3, a fourth period PR4, and a fifth period PR5. The first to fifth periods PR1 to PR5 may be included in a single frame period. The length of the third period PR3 and the length of one horizontal period (or a data writing period) may be the same (or substantially the same), but embodiments of the disclosure are not limited thereto. The length of the third period PR3 and the sum of the length of the first period PR1 and the length of the second period PR2 may be the same (or substantially the same), but embodiments of the disclosure are not limited thereto. The length of the first period PR1 and the length of the second period PR2 may be the same (or substantially the same), but embodiments of the disclosure are not limited thereto.

Figure 8:
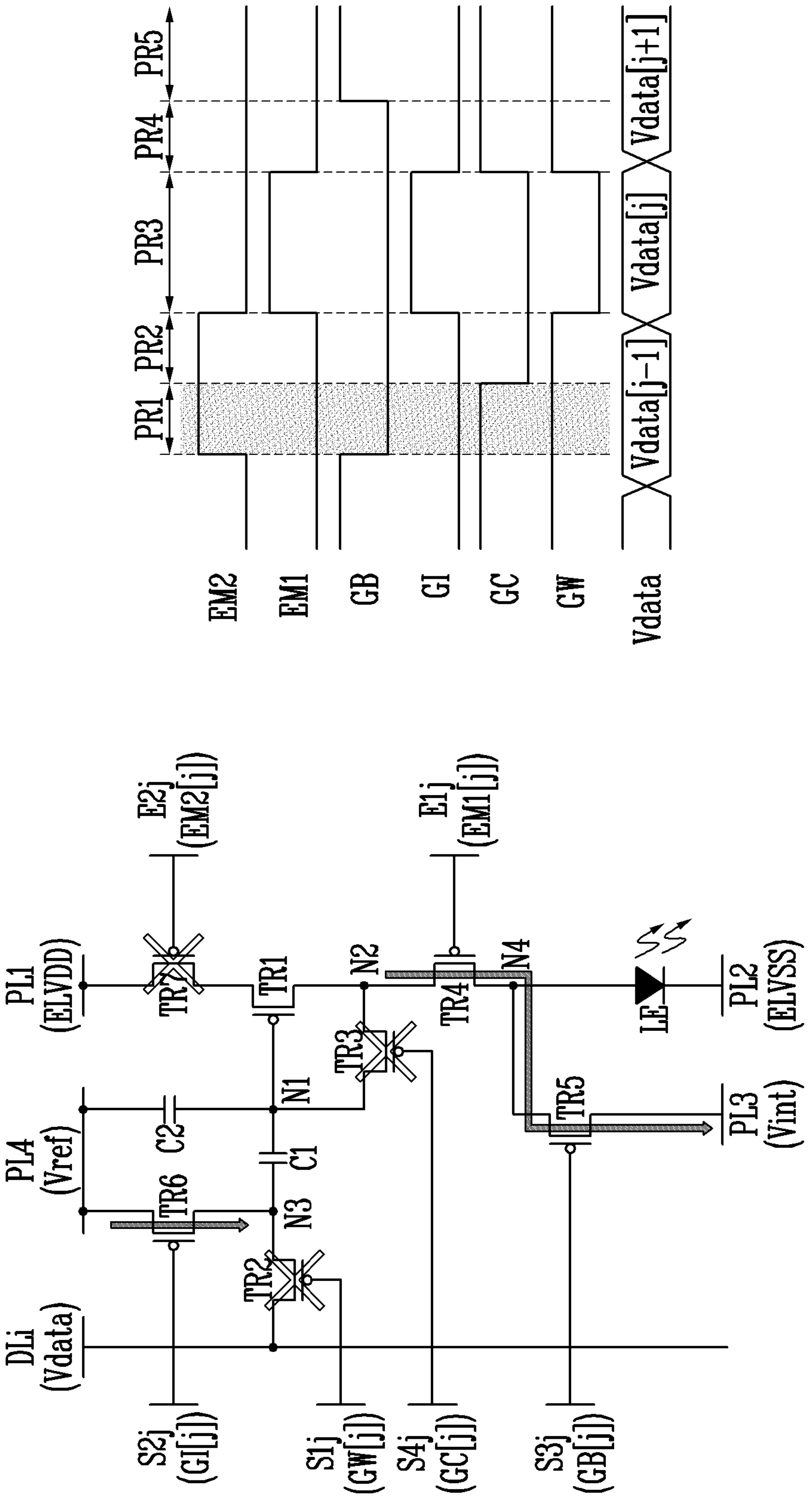

Referring to FIG. 8, during the first period PR1, a turn-off level of the first scan signal GW[j] may be applied, a turn-on level of the second scan signal GI[j] may be applied, a turn-on level of the third scan signal GB[j] may be applied, a turn-off level of the fourth scan signal GC[j] may be applied, a turn-on level of the first emission signal EM1[*j*] may be applied, and a turn-off level of the second emission signal EM2[*j*] may be applied. A data voltage Vdata[j−1] may be applied to the data line DL.

During the first period PR1, the fourth node N4 may be electrically connected to the third power line PL3. A voltage VN4 of the fourth node N4 is given by the Equation 2 below.

$$VN4 = Vint + |Vth|\_TR5 \quad \text{[Equation 2]}$$

In Equation 2, VN4 may be a voltage of the fourth node N4. Vint may be the third power voltage Vint. |Vth|_TR5 may be an absolute value of the threshold voltage of the fifth transistor TR5.

During the first period PR1, no current flows through the light emitting element LE. Hence, the voltage of the fourth node N4 may satisfy conditions described by the Equation 3 below.

$$VN4 - ELVSS < Vth \text{ of } LE \quad \text{[Equation 3]}$$

In Equation 3, VN4 may be a voltage of the fourth node N4. ELVSS may be the second power voltage ELVSS. Vth of LE may be a threshold voltage of the light emitting element LE. For example, a voltage difference (VN4−ELVSS) between the opposite ends of the light emitting element LE may be less than the threshold voltage of the light emitting element (Vth of LE), and current (e.g., driving current) may not flow through the light emitting element LE.

During the first period PR1, the third node N3 may be electrically connected to the fourth power line PL4. A voltage of the third node N3 and the fourth power voltage Vref may be the same (or substantially the same).

The first period PR1 may be an initialization period of the light emitting element LE (e.g., a period during which a voltage of the anode electrode of the light emitting element LE is initialized).

Figure 9:
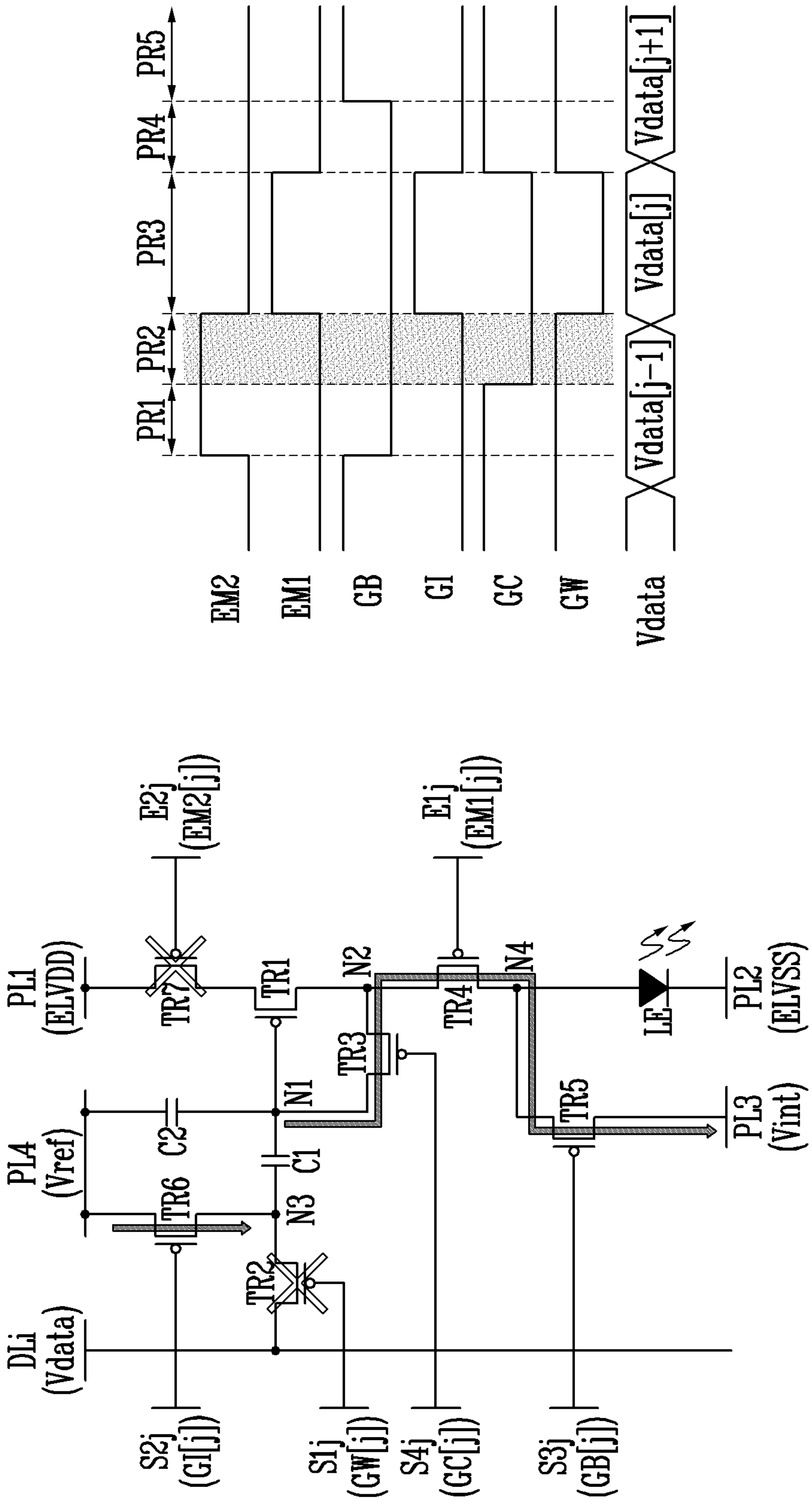

Referring to FIG. 9, during the second period PR2, a turn-off level of the first scan signal GW[j] may be applied, a turn-on level of the second scan signal GI[j] may be applied, a turn-on level of the third scan signal GB[j] may be applied, a turn-on level of the fourth scan signal GC[j] may be applied, a turn-on level of the first emission signal EM1[*j*] may be applied, and a turn-off level of the second emission signal EM2[*j*] may be applied. A data voltage Vdata[j−1] may be applied to the data line DL (e.g., the data line DLi).

During the second period PR2, the first node N1, the second node N2, and the fourth node N4 may be electrically connected to each other. During the second period PR2, a voltage VN1 of the first node N1 may be given by Equation 4.

$$VN1 = VN4 = Vint + |Vth|\_TR5 \quad \text{[Equation 4]}$$

In Equation 4, VN1 may be a voltage of the first node N1. VN4 may be a voltage of the fourth node N4. Referring to Equation 4 along with Equation 2, the voltage of the first node N1 and the Vint+|Vth|_TR5 may be the same (or substantially the same).

During the second period PR2, the voltage of the first node N1 may be a turn-on level voltage of the first transistor TR1. The purpose of the foregoing is to charge the first capacitor C1 by applying a voltage to the first node N1 through the first transistor TR1 during the third period PR3 to be described below. Hence, the voltage VN1 of the first node N1 may satisfy the Equation 5 below.

$$ELVDD - |Vth|\_TR1 > VN1 \quad \text{[Equation 5]}$$

In Equation 5, ELVDD may be the first power voltage that is to be applied to the source electrode of the first transistor TR1. |Vth|_TR1 may be an absolute value of the threshold voltage of the first transistor TR1. VN1 may be a voltage of the first node N1.

The second period PR2 may be an initialization period of the first transistor TR1 (e.g., a period during which a voltage to be applied to the gate electrode of the first transistor TR1 is initialized).

Figure 10:
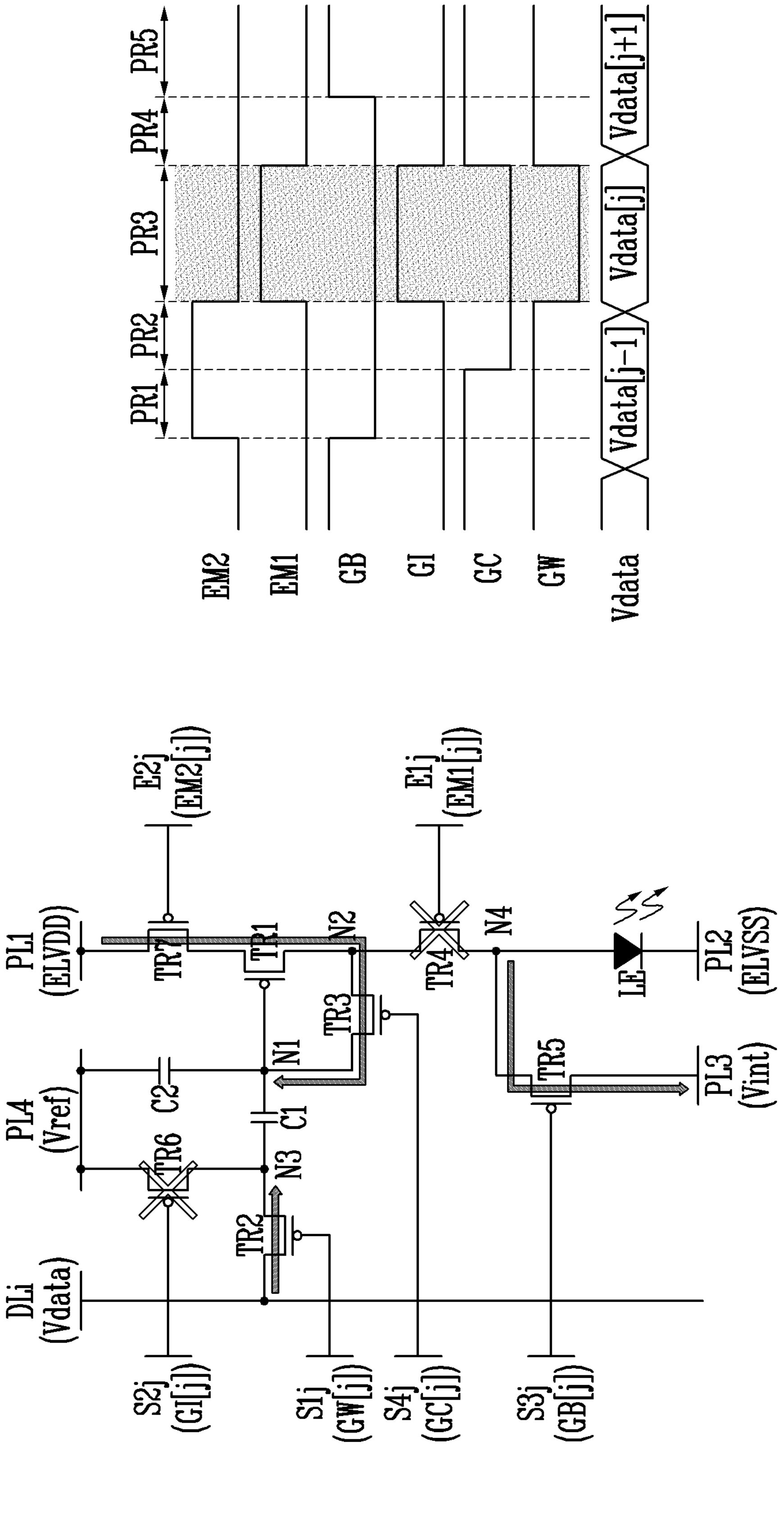

Referring to FIG. 10, during the third period PR3, a turn-on level of the first scan signal GW[j] may be applied, a turn-off level of the second scan signal GI[j] may be applied, a turn-on level of the third scan signal GB[j] may be applied, a turn-on level of the fourth scan signal GC[j] may be applied, a turn-off level of the first emission signal EM1[*j*] may be applied, and a turn-on level of the second emission signal EM2[*j*] may be applied. A data voltage Vdata[j] may be applied to the data line DL (e.g., the data line DLi).

In case that a turn-on level of the first scan signal GW[j] is applied, the data voltage Vdata[j] may be inputted. The data voltage Vdata[j] or a voltage corresponding thereto may be applied to the third node N3.

A voltage VN3 of the third node N3 may be given by the Equation 6 below.

$$VN3 = Vdata \quad \text{[Equation 6]}$$

In Equation 6, VN3 may be a voltage of the third node N3. Vdata may be the data voltage Vdata[j].

During the third period PR3, the first transistor TR1 and the third transistor TR3 may be turned on, and the voltage of the first node N1 may be charged until the first transistor TR1 is turned off. During the third period PR3, the voltage of the first node N1 may be given by Equation 7.

$$VN1 = ELVDD - |Vth|\_\mathrm{TR1} \quad \text{[Equation 7]}$$

In Equation 7, VN1 may be a voltage of the first node N1. ELVDD may be the first power voltage. |Vth|_TR1 may be an absolute value of the threshold voltage of the first transistor TR1. A voltage applied to the source electrode of the first transistor TR1 may correspond to the first power voltage ELVDD.

During the third period PR3, the first capacitor C1 may store a voltage corresponding to a voltage difference between the first node N1 and the third node N3. During the third period PR3, the second capacitor C2 may store a voltage corresponding to a voltage difference between the first node N1 and the fourth power voltage Vref.

The third period PR3 may be a period in which the threshold voltage of the first transistor TR1 is tracked to compensate for variations in threshold voltage of the first transistor TR1. The third period PR3 may be a data writing period.

Figure 11:
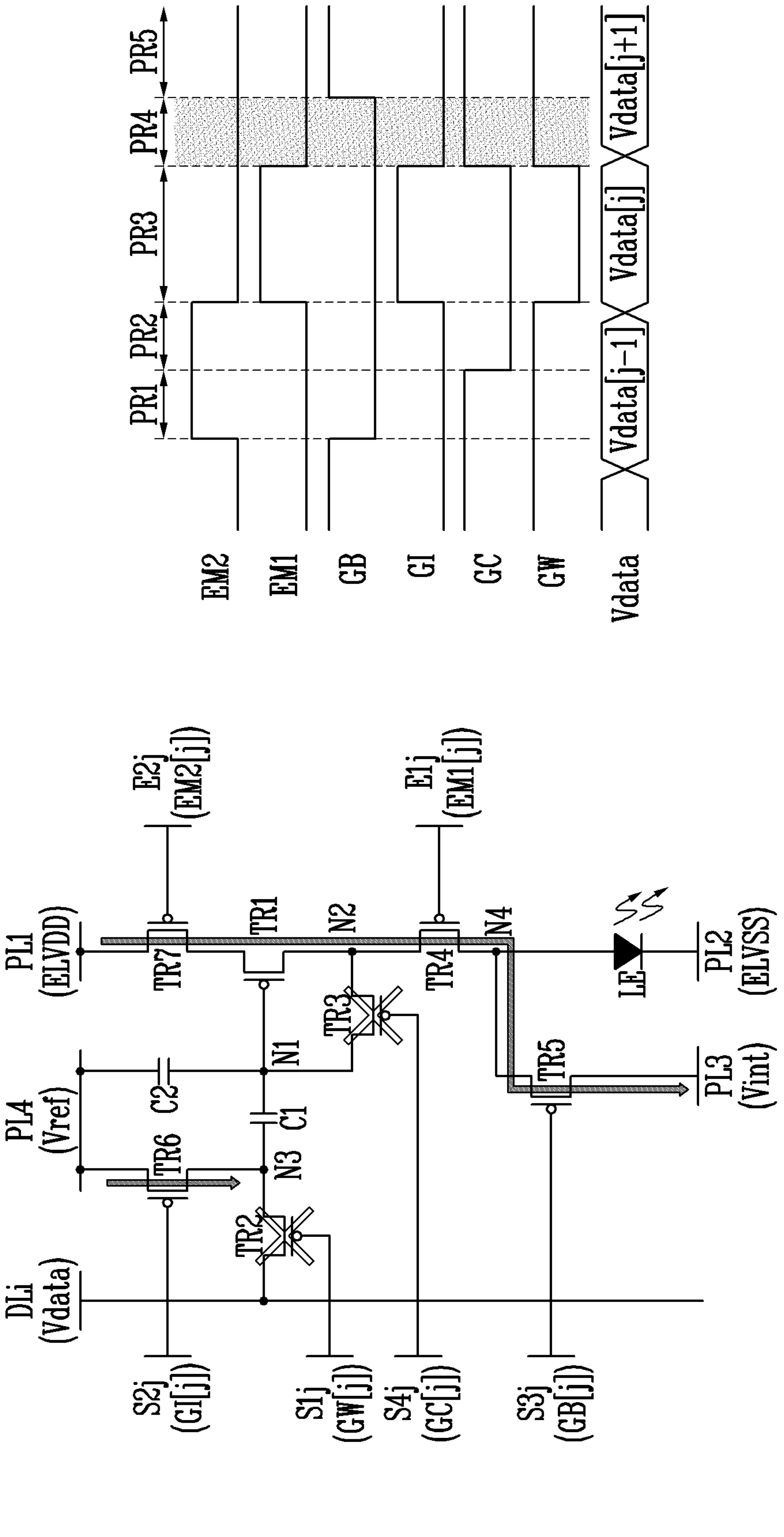

Referring to FIG. 11, during the fourth period PR4, a turn-off level of the first scan signal GW[j] may be applied, a turn-on level of the second scan signal GI[j] may be applied, a turn-on level of the third scan signal GB[j] may be applied, a turn-off level of the fourth scan signal GC[j] may be applied, a turn-on level of the first emission signal EM1[*j*] may be applied, and a turn-on level of the second emission signal EM2[*j*] may be applied. A data voltage Vdata[j+1] may be applied to the data line DL (e.g., the data line DLi).

During the fourth period PR4, the turn-on level of the second scan signal GI[j] may be applied, and the sixth transistor TR6 may be turned on. The voltage of the third node N3 may change to the fourth power voltage Vref. According to the law of charge conservation, the voltage VN1 of the first node N1 may be given by the Equation 8 below.

$$VN1 = ELVDD + \frac{C1}{C1 + C2}(Vref - Vdata) - |Vth|\_\mathrm{TR1} \quad \text{[Equation 8]}$$

In Equation 8, VN1 may be a voltage of the first node N1. ELVDD may be the first power voltage that is to be applied to the source electrode of the first transistor TR1. C1 may be a capacitance of the first capacitor C1. C2 may be a capacitance of the second capacitor C2. Vref may be the fourth power voltage Vref. Vdata may be the data voltage Vdata[j]. |Vth|_TR1 may be a threshold voltage of the first transistor TR1.

Referring to Equation 8, the voltage of the first node N1 may be determined based on the capacitance of the first capacitor C1 and the capacitance of the second capacitor C2 (or based on a ratio between the capacitances of the first capacitor C1 and the second capacitor C2). The capacitance of a capacitor may be proportional to an overlapping cross-sectional area of two electrodes facing each other. Based on this, the capacitance of the first capacitor C1 may be controlled by adjusting the surface area of the overlapping area between the two electrodes (e.g., the electrode E11 (refer to FIG. 4) and the counter electrode E12 (refer to FIG. 4)) facing each other. The capacitance of the second capacitor C2 may be controlled by adjusting the surface area of the overlapping area between the two electrodes (e.g., the electrode E21 (refer to FIG. 4) and the counter electrode E22 (refer to FIG. 4)) facing each other.

During a process of deriving a voltage to be applied to the gate electrode of the first transistor TR1 (i.e., the voltage VN1 of the first node N1), a voltage of the source electrode of the first transistor TR1 may be maintained constant at the first power supply voltage ELVDD. Therefore, a difference between the voltage of the source electrode of the first transistor TR1 and the voltage of the body electrode may be maintained constant, thus mitigating (or minimizing) variations in the threshold voltage of the first transistor TR1 due to the body effect.

During the fourth period PR4, a turn-on level of the first emission signal EM1[*j*], a turn-on level of the second emission signal EM2[*j*], and a turn-on level of the third scan signal GB[j] may be applied. During the fourth period PR4, the light emitting element LE may not emit light.

Figure 12:
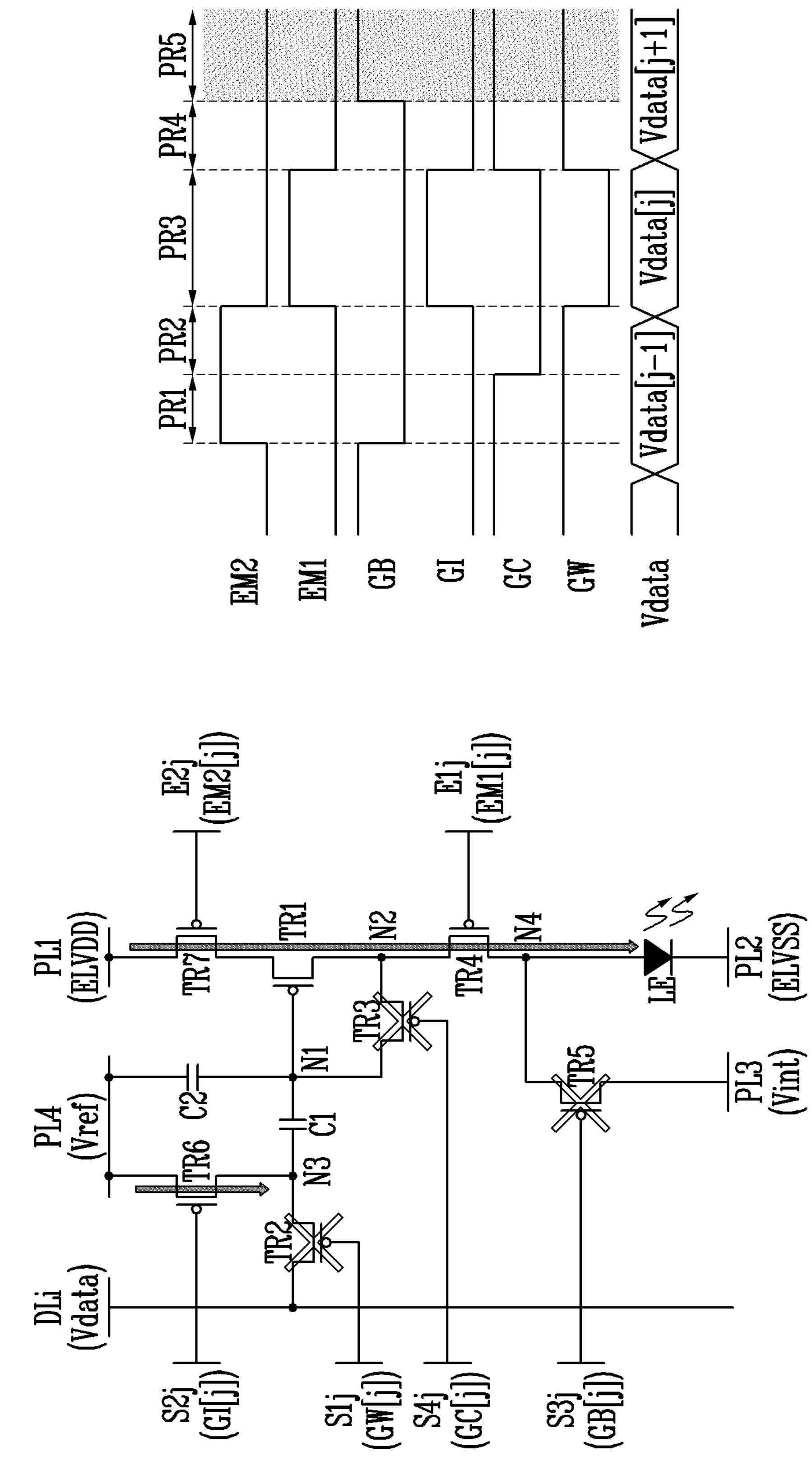

Referring to FIG. 12, during the fifth period PR5, a turn-off level of the first scan signal GW[j] may be applied, a turn-on level of the second scan signal GI[j] may be applied, a turn-off level of the third scan signal GB[j] may be applied, a turn-off level of the fourth scan signal GC[j] may be applied, a turn-on level of the first emission signal EM1[*j*] may be applied, and a turn-on level of the second emission signal EM2[*j*] may be applied. A data voltage Vdata[j+1] may be applied to the data line DL.

During the fifth period PR5, driving current corresponding to the data voltage Vdata[j] may flow through the light emitting element LE. The source voltage Vs, the gate voltage Vg, and a source-gate voltage difference Vsg of the first transistor TR1 may be given by Equation 9.

$$Vs = ELVDD,\ Vg = VN1,\ Vsg = ELVDD - VN1 \qquad \text{[Equation 9]}$$

The magnitude of driving current flowing through the first transistor TR1 may be determined by a difference between the source-gate voltage difference Vsg and the threshold voltage of the first transistor TR1. The difference between the source-gate voltage difference Vsg and the threshold voltage of the first transistor TR1 may be given by Equation 10.

$$Vsg - |Vth|\_\mathrm{TR1} = \left(\frac{C1}{C1 + C2}\right) \times (Vref - Vdata) \qquad \text{[Equation 10]}$$

In Equation 10, Vsg may be a source-gate voltage difference of the first transistor TR1. |Vth| TR1 may be an absolute value of the threshold voltage of the first transistor TR1. C1 may be a capacitance of the first capacitor C1. C2 may be a capacitance of the second capacitor C2. Vdata may be a data voltage Vdata[j] input to a sub-pixel. Vref may be the fourth power voltage.

Hence, the first transistor TR1 may compensate for variations in the threshold voltage Vth, and allow driving current to flow therethrough without being affected by the variations in the threshold voltage. Consequently, the display quality may be improved.

Furthermore, the first transistor TR1 may maintain a voltage of the source electrode constant at the first power voltage ELVDD. As a result, during a period in which the threshold voltage of the first transistor TR1 is compensated for, the voltage of the source electrode may remain constant, or may vary at a minimal level. Hence, the body effect on the first transistor TR1 may be mitigated, and the display quality may be improved.

The fifth period PR5 may correspond to a period during which the light emitting element LE emits light.

Consequently, in a sub-pixel and a display device including the sub-pixel in accordance with embodiments of the disclosure, the body effect may be mitigated, and the display quality may be improved.

FIGS. 13, 14, 15, 16, 17, 18, and 19 are schematic diagrams of equivalent circuits of the sub-pixel, and illustrate a method 1300 of driving a display device including the sub-pixel in accordance with another embodiment of the disclosure.

Figure 13:
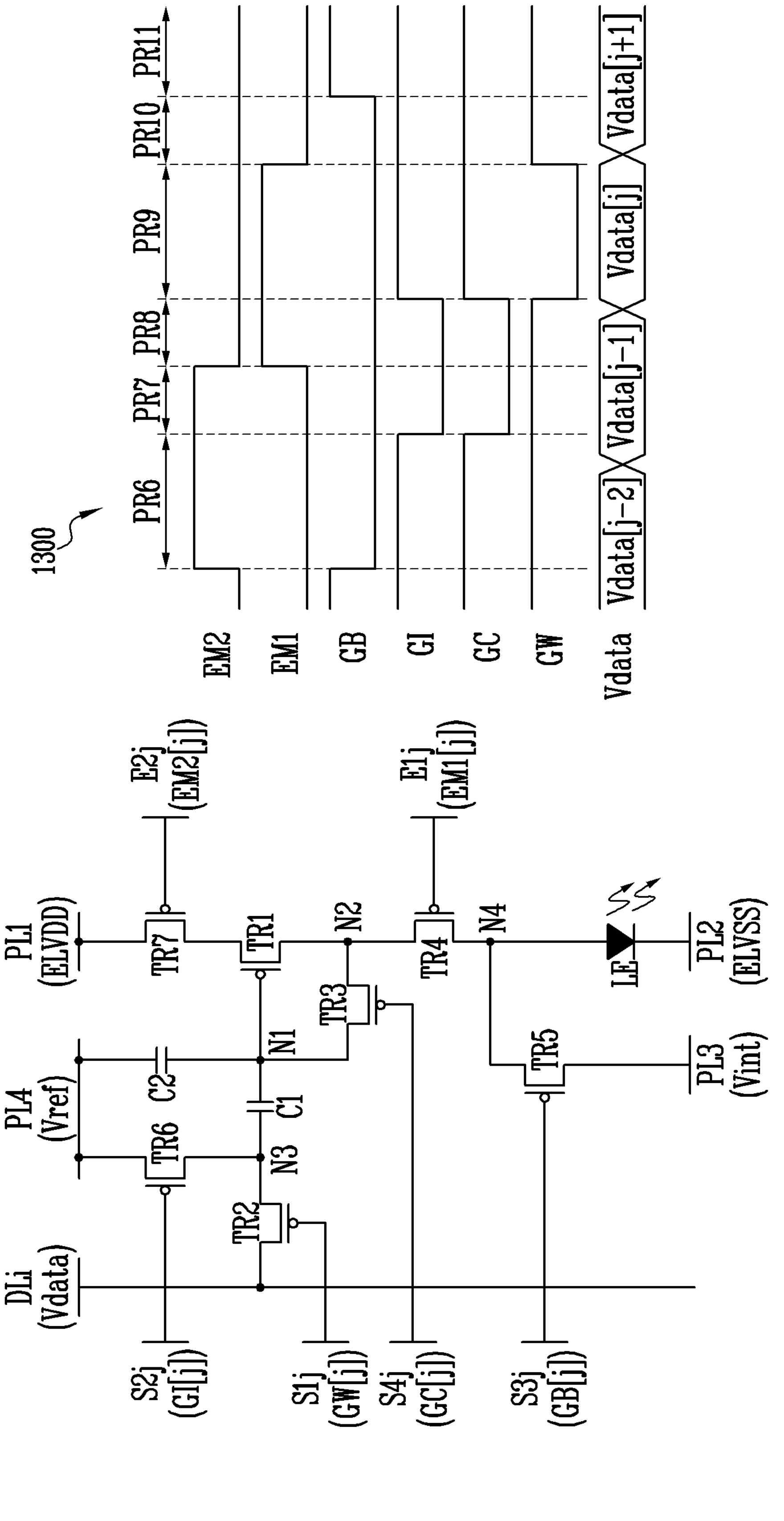
FIGS. 13, 14, 15, 16, 17, 18, and 19 are schematic diagrams of equivalent circuits of the sub-pixel, and illustrate a method of driving a display device including the sub-pixel in accordance with another embodiment of the disclosure.

Referring to FIG. 13, the method 1300 of driving the display device in accordance with embodiments of the disclosure may include a sixth period PR6, a seventh period PR7, an eighth period PR8, a ninth period PR9, a tenth period PR10, and an eleventh period PR11.

The length of the ninth period PR9 and the length of one horizontal period (i.e., a period during which the data voltage Vdata is inputted to the sub-pixel) may be same (or substantially same). The length of the ninth period PR9 and the sum of the length of the seventh period PR7 and the length of the eighth period PR8 may be the same (or substantially the same), but embodiments of the disclosure are not limited thereto. The length of the seventh period PR7 and the length of the eighth period PR8 may be the same (or substantially the same), but embodiments of the disclosure are not limited thereto. Although the length of the tenth period PR10 may be less than the length of the ninth period PR9, embodiments of the disclosure are not limited thereto.

Figure 14:
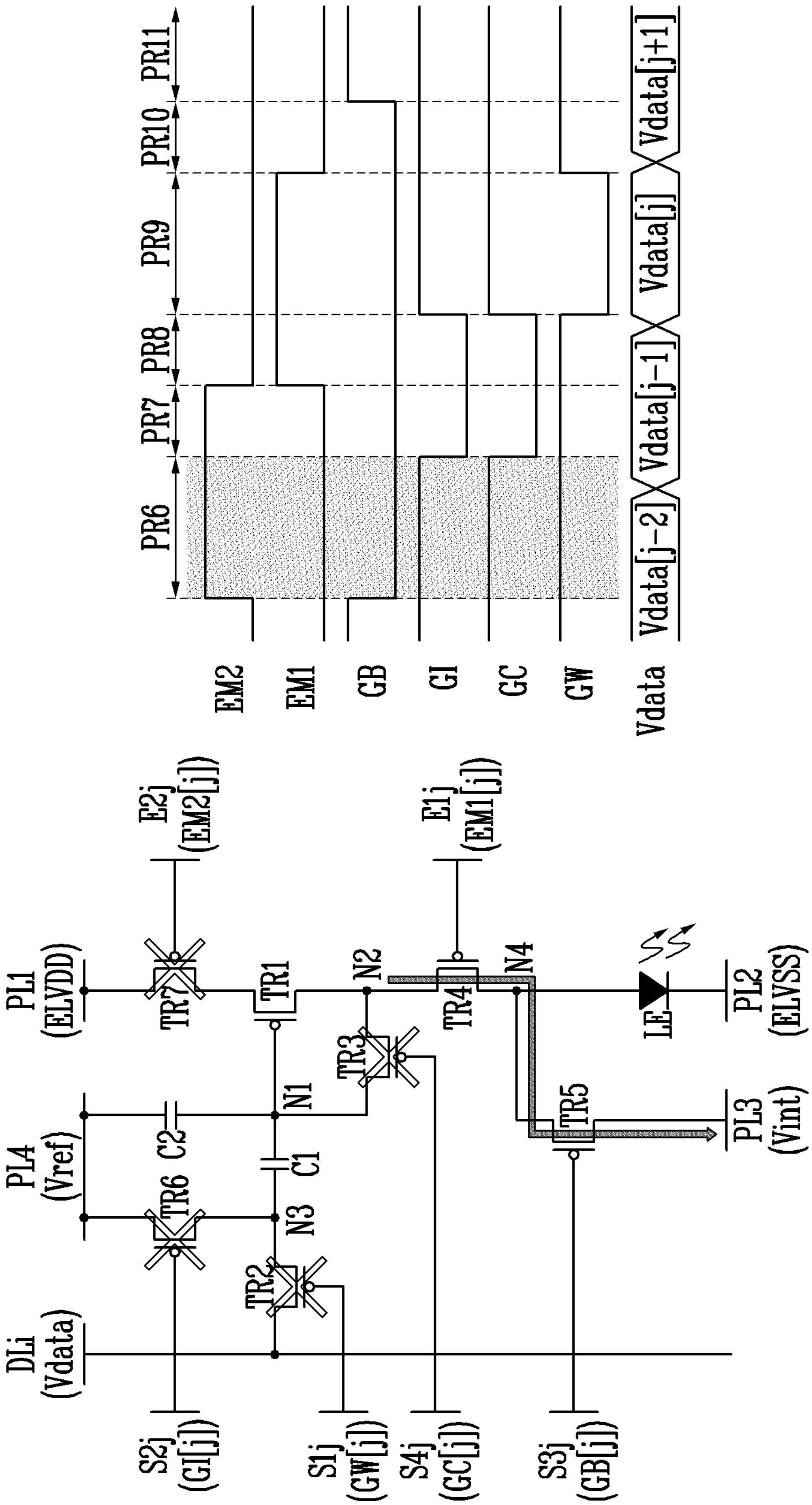

Referring to FIG. 14, during the seventh period PR6, a turn-off level of the first scan signal GW[j] may be applied, a turn-off level of the second scan signal GI[j] may be applied, a turn-on level of the third scan signal GB[j] may be applied, a turn-off level of the fourth scan signal GC[j] may be applied, a turn-on level of the first emission signal EM1[*j*] may be applied, and a turn-off level of the second emission signal EM2[*j*] may be applied. A data voltage Vdata[j−2] may be applied to the data line DL.

A voltage VN4 of the fourth node N4 may be given by the Equation 11.

$$VN4 = Vint + |Vth|\_\mathrm{TR5} \qquad \text{[Equation 11]}$$

Equation 11 and Equation 2 may be the same. In Equation 11, VN4 may be a voltage of the fourth node N4. Vint may be the third power voltage Vint. |Vth|_TR5 may be an absolute value of the threshold voltage of the transistor TR5.

During the sixth period PR6, no current may flow through the light emitting element LE. Hence, the voltage of the fourth node N4 may satisfy conditions described by the Equation 12 below.

$$VN4 - ELVSS < Vth \text{ of } LE \quad \text{[Equation 12]}$$

Equation 12 and Equation 3 may be the same. In Equation 12, VN4 may be a voltage of the fourth node N4. ELVSS may be the second power voltage ELVSS. Vth of LE may be a threshold voltage of the light emitting element LE. For example, a voltage difference (VN4–ELVSS) between the opposite ends of the light emitting element LE may be less than the threshold voltage of the light emitting element (Vth of LE), and current (e.g., driving current) may not flow through the light emitting element LE.

The sixth period PR6 may be an initialization period of the light emitting element LE (e.g., a period of initializing a voltage to be applied to the anode electrode of the light emitting element LE).

Figure 15:
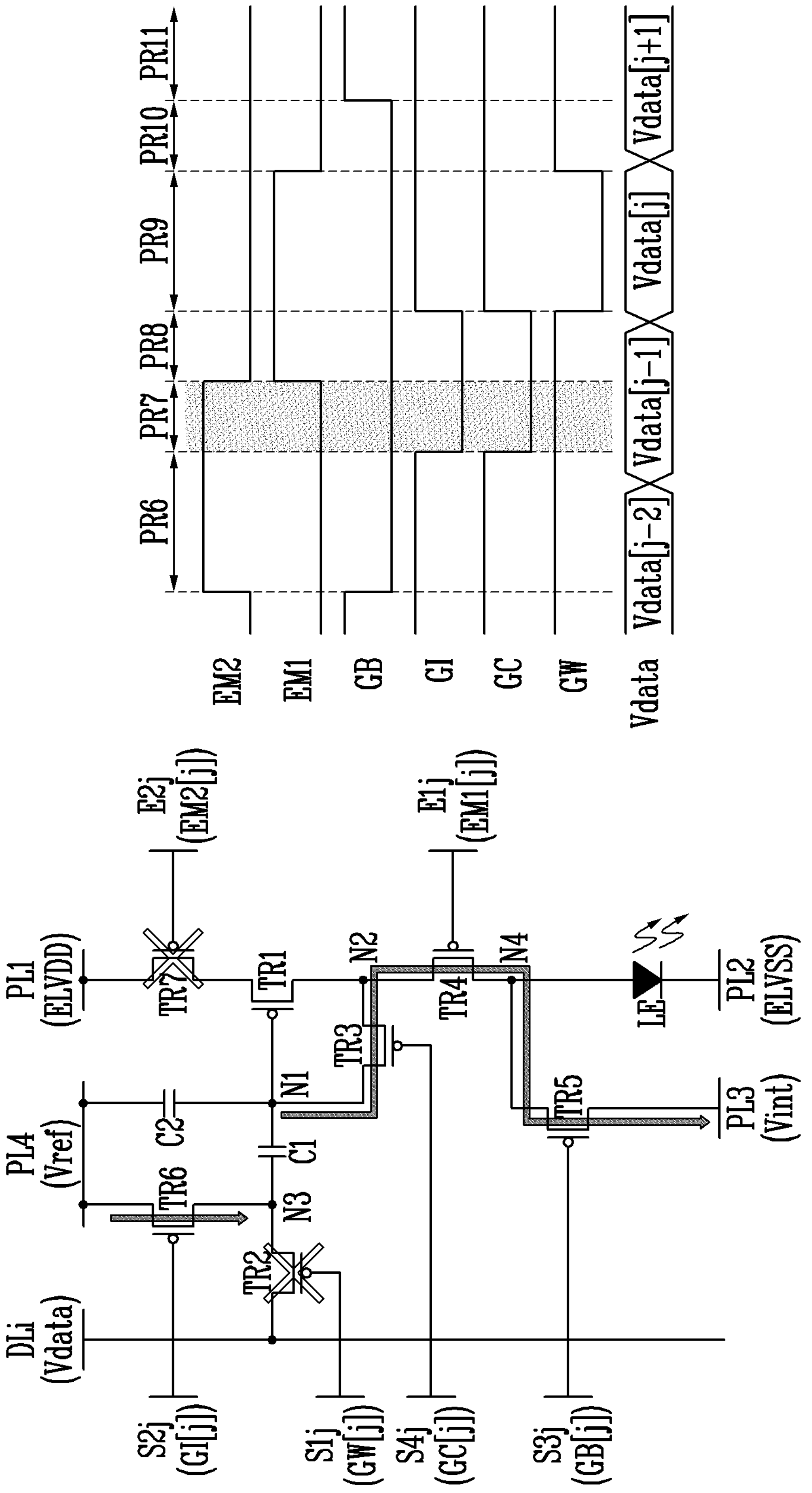

Referring to FIG. 15, during the seventh period PR7, a turn-off level of the first scan signal GW[j] may be applied, a turn-on level of the second scan signal GI[j] may be applied, a turn-on level of the third scan signal GB[j] may be applied, a turn-on level of the fourth scan signal GC[j] may be applied, a turn-on level of the first emission signal EM1[*j*] may be applied, and a turn-off level of the second emission signal EM2[*j*] may be applied. A data voltage Vdata[j−1] may be applied to the data line DL (e.g., the data line DLi).

During the seventh period PR7, the third node N3 may be electrically connected to the fourth power line PL4. A voltage of the third node N3 and the fourth power voltage Vref may be the same (or substantially the same).

During the seventh period PR7, the first node N1, the second node N2, and the fourth node N4 may be electrically connected to each other. During the seventh period PR7, the voltage VN1 of the first node N1 may be given by Equation 13.

$$VN1 = VN4 = Vint + |Vth|\_\text{TR5} \quad \text{[Equation 13]}$$

Equation 13 and Equation 4 may be the same. In Equation 13, VN1 may be a voltage of the first node N1. VN4 may be a voltage of the fourth node N4. Referring to Equation 13 along with Equation 2, the voltage of the first node N1 may be the same (or substantially the same) as the Vint+|Vth|_TR5.

During the seventh period PR7, the voltage of the first node N1 may be a turn-on level voltage of the first transistor TR1. The purpose of the foregoing is to charge the first capacitor C1 by applying a voltage to the first node N1 through the first transistor TR1 during the eighth period PR8 to be described below. Hence, the voltage VN1 of the first node N1 may satisfy the Equation 14 below.

$$ELVDD - |Vth|\_\text{TR1} > VN1 \quad \text{[Equation 14]}$$

Equation 14 and Equation 5 may be the same. In Equation 14, ELVDD may be the first power voltage that is to be applied to the source electrode of the first transistor TR1. |Vth|_TR1 may be an absolute value of the threshold voltage of the first transistor TR1. VN1 may be a voltage of the first node N1.

The seventh period PR7 may be an initialization period of the first transistor TR1 (e.g., a period during which a voltage to be applied to the gate electrode of the first transistor TR1 is initialized).

Figure 16:
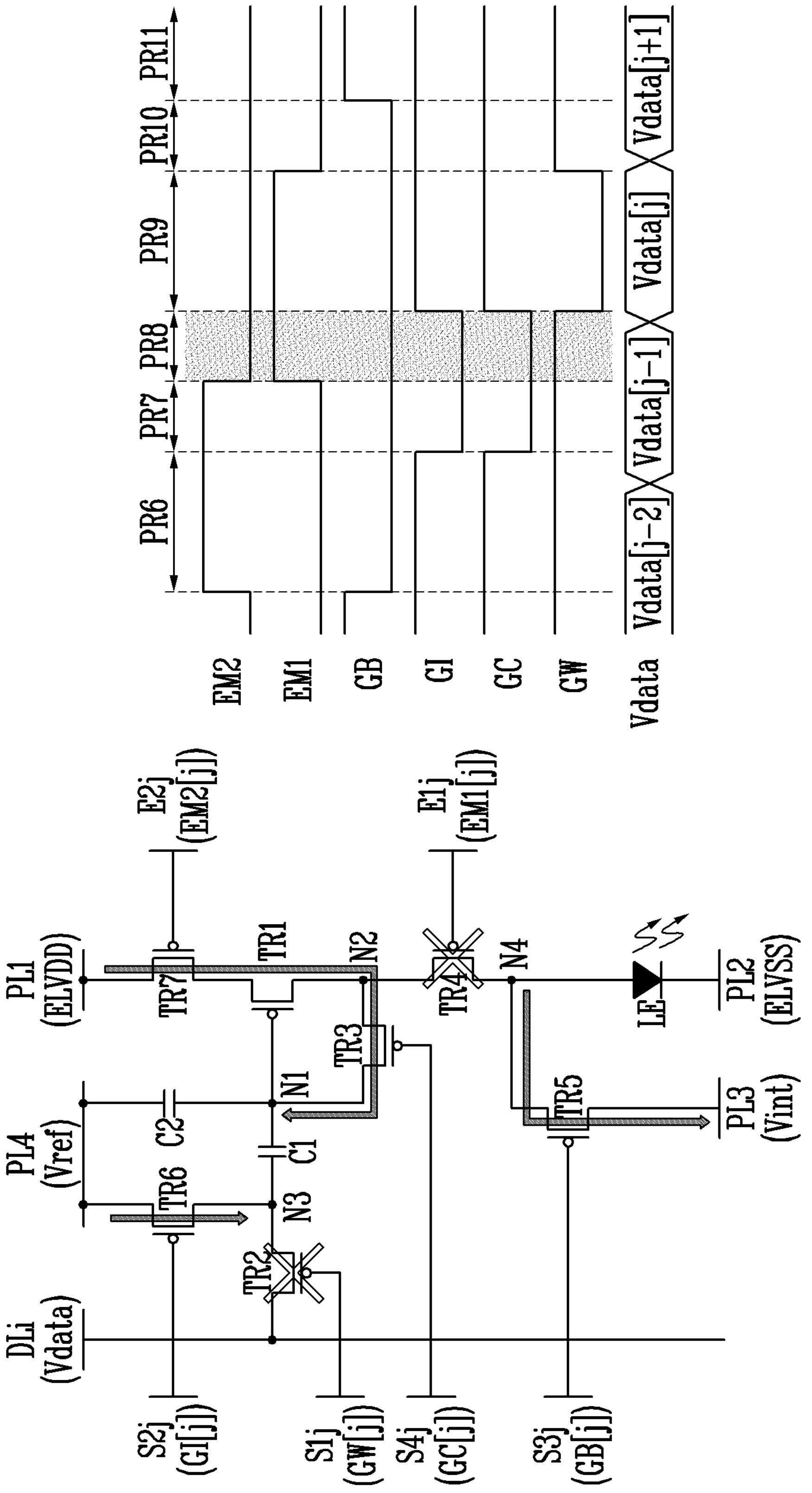

Referring to FIG. 16, during the eighth period PR8, a turn-off level of the first scan signal GW[j] may be applied, a turn-on level of the second scan signal GI[j] may be applied, a turn-on level of the third scan signal GB[j] may be applied, a turn-on level of the fourth scan signal GC[j] may be applied, a turn-off level of the first emission signal EM1[*j*] may be applied, and a turn-on level of the second emission signal EM2[*j*] may be applied. A data voltage Vdata[j−1] may be applied to the data line DL (e.g., the data line DLi).

During the eighth period PR8, the first transistor TR1 and the third transistor TR3 may be turned on, and the voltage of the first node N1 may be charged until the first transistor TR1 is turned off. During the eighth period PR8, the voltage VN1 of the first node N1 may be given by Equation 15.

$$VN1 = ELVDD - |Vth|\_\text{TR1} \quad \text{[Equation 15]}$$

Equation 15 and Equation 7 may be the same. In Equation 15, VN1 may be a voltage of the first node N1. ELVDD may be the first power voltage. |Vth|_TR1 may be an absolute value of the threshold voltage of the first transistor TR1. A voltage of the source electrode of the first transistor TR1 may correspond to the first power voltage ELVDD.

During the eighth period PR8, the fourth power voltage Vref or a voltage corresponding thereto may be applied to the third node N3.

During the eighth period PR8, the first capacitor C1 may store a voltage corresponding to a voltage difference between the first node N1 and the third node N3. During the third period PR3, the second capacitor C2 may store a voltage corresponding to a voltage difference between the first node N1 and the fourth power voltage Vref.

The third period PR8 may be a period in which the threshold voltage of the first transistor TR1 is tracked to compensate for variations in threshold voltage of the first transistor TR1.

Figure 17:
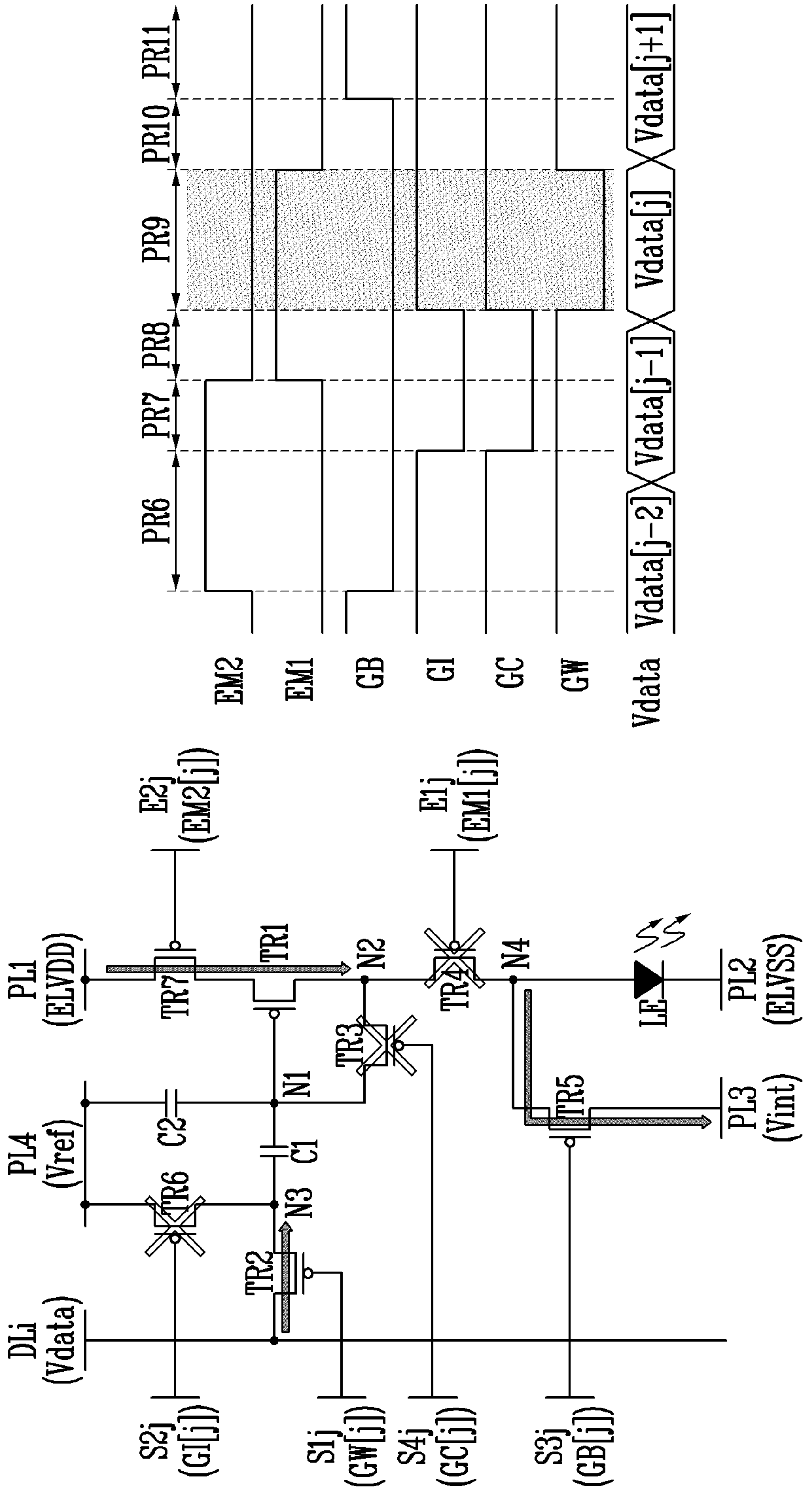

Referring to FIG. 17, during the ninth period PR9, a turn-on level of the first scan signal GW[j] may be applied, a turn-off level of the second scan signal GI[j] may be applied, a turn-on level of the third scan signal GB[j] may be applied, a turn-off level of the fourth scan signal GC[j] may be applied, a turn-off level of the first emission signal EM1[*j*] may be applied, and a turn-on level of the second emission signal EM2[*j*] may be applied. A data voltage Vdata[j] may be applied to the data line DL.

In case that a turn-on level of the first scan signal GW[j] is applied, the data voltage Vdata[j] may be inputted. The data voltage Vdata[j] or a voltage corresponding thereto may be applied to the third node N3.

A voltage VN3 of the third node N3 may be given by the Equation 16 below.

$$VN3 = Vdata \quad \text{[Equation 16]}$$

Equation 16 and Equation 3 may be the same as. In Equation 16, VN3 may be a voltage of the third node N3. Vdata may be the data voltage Vdata[j].

According to the law of charge conservation, the voltage VN1 of the first node N1 during the ninth period PR9 may be given by the Equation 17 below.

$$VN1 = ELVDD + \frac{C1}{C1 + C2}(Vdata - Vref) - |Vth|\_\mathrm{TR1} \quad \text{[Equation 17]}$$

Equation 17 and Equation 8 may be different in that Equation 17 includes the multiplication of (Vdata-Vref) instead of (Vref-Vdata). This may result from the variation of the voltage of the third node N3 from the fourth power voltage Vref to the data voltage Vdata[j] during the ninth period PR9. In Equation 17, VN1 may be a voltage of the first node N1. ELVDD may be the first power voltage that is applied to the source electrode of the first transistor TR1. C1 may be a capacitance of the first capacitor C1. C2 may be a capacitance of the second capacitor C2. Vref may be the fourth power voltage Vref. Vdata may be the data voltage Vdata[j]. |Vth|_TR1 may be a threshold voltage of the first transistor TR1.

As previously described, the voltage of the first node N1 may be determined based on the capacitance of the first capacitor C1 and the capacitance of the second capacitor C2 (or based on a ratio between the capacitances of the first capacitor C1 and the second capacitor C2). The capacitance of a capacitor may be proportional to an overlapping cross-sectional area of two electrodes facing each other. Based on this, the capacitance of the first capacitor C1 may be controlled by adjusting the surface area of the overlapping area between the two electrodes (e.g., the one electrode E11 (refer to FIG. 4) and the counter electrode E12 (refer to FIG. 4)) facing each other. The capacitance of the second capacitor C2 may be controlled by adjusting the surface area of the overlapping area between the two electrodes (e.g., the one electrode E21 (refer to FIG. 4) and the counter electrode E22 (refer to FIG. 4)) facing each other.

During a process of deriving a voltage to be applied to the gate electrode of the first transistor TR1 (i.e., the voltage VN1 of the first node N1), a voltage of the source electrode of the first transistor TR1 may be maintained constant at the first power supply voltage ELVDD. Therefore, a difference between the voltage of the source electrode of the first transistor TR1 and the voltage of the body electrode may be maintained constant, thus mitigating (or minimizing) variations in the threshold voltage of the first transistor TR1 due to the body effect.

The ninth period PR9 may correspond to a data write period.

Figure 18:
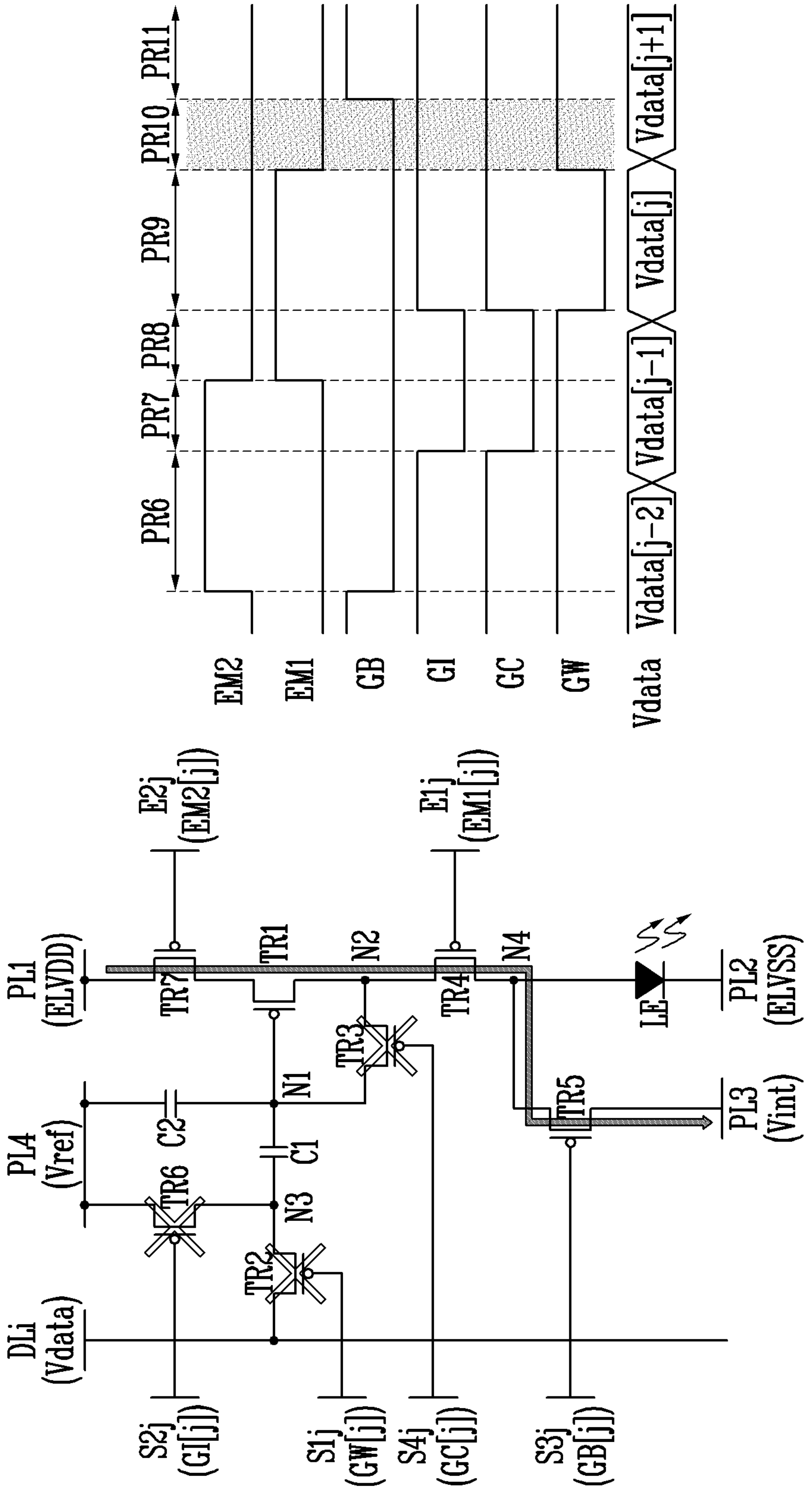

Referring to FIG. 18, during the tenth period PR10, a turn-off level of the first scan signal GW[j] may be applied, a turn-off level of the second scan signal GI[j] may be applied, a turn-on level of the third scan signal GB[j] may be applied, a turn-off level of the fourth scan signal GC[j] may be applied, a turn-on level of the first emission signal EM1[*j*] may be applied, and a turn-on level of the second emission signal EM2[*j*] may be applied. A data voltage Vdata[j+1] may be applied to the data line DL (e.g., the data line DLi).

During the tenth period PR10, a turn-on level of the first emission signal EM1[*j*], a turn-on level of the second emission signal EM2[*j*], and a turn-on level of the third scan signal GB[j] may be applied. During the tenth period PR10, the light emitting element LE may not emit light.

Figure 19:
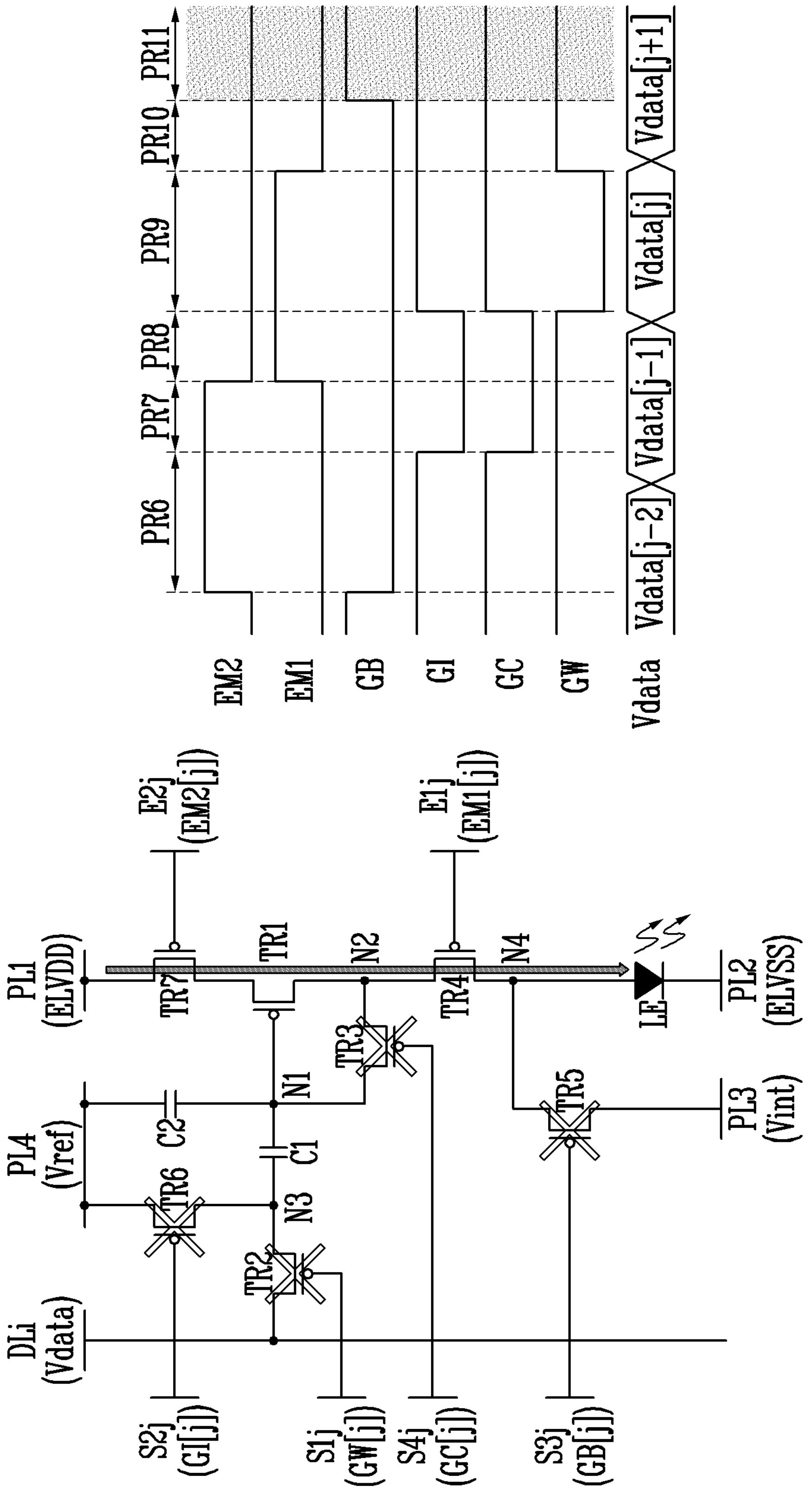

Referring to FIG. 19, during the eleventh period PR11, a turn-off level of the first scan signal GW[j] may be applied, a turn-off level of the second scan signal GI[j] may be applied, a turn-off level of the third scan signal GB[j] may be applied, a turn-off level of the fourth scan signal GC[j] may be applied, a turn-on level of the first emission signal EM1[*j*] may be applied, and a turn-on level of the second emission signal EM2[*j*] may be applied. A data voltage Vdata[j+1] may be applied to the data line DL (e.g., the data line DLi).

During the eleventh period PR11, driving current corresponding to the data voltage Vdata[j] may flow through the light emitting element LE. The source voltage Vs, the gate voltage Vg, and a source-gate voltage difference Vsg of the first transistor TR1 may be given by Equation 18.

$$Vs = ELVDD,\ Vg = VN1,\ Vsg = ELVDD - VN1 \quad \text{[Equation 18]}$$

Equation 18 and Equation 9 may be the same. The magnitude of driving current flowing through the first transistor TR1 may be determined by a difference between the source-gate voltage difference Vsg and the threshold voltage of the first transistor TR1. The difference between the source-gate voltage difference Vsg and the threshold voltage of the first transistor TR1 may be given by Equation 19.

$$Vsg - |Vth|\_\mathrm{TR1} = \left(\frac{C1}{C1 + C2}\right) \times (Vdata - Vref) \quad \text{[Equation 19]}$$

Equation 19 and Equation 10 may be different in that Equation 19 includes the multiplication of (Vdata-Vref) instead of (Vref-Vdata). In Equation 19, Vsg may be a source-gate voltage difference of the first transistor TR1. |Vth|_TR1 may be an absolute value of the threshold voltage of the first transistor TR1. C1 may be a capacitance of the first capacitor C1. C2 may be a capacitance of the second capacitor C2. Vdata may be a data voltage Vdata[j] input to the sub-pixel. Vref may be the fourth power voltage.

Hence, the first transistor TR1 may compensate for variations in the threshold voltage Vth, and allow driving current to flow therethrough without being affected by the variations in the threshold voltage. Consequently, the display quality may be improved.

Furthermore, the first transistor TR1 may maintain a voltage of the source electrode constant at the first power voltage ELVDD. As a result, during a period in which the threshold voltage of the first transistor TR1 is compensated for, the voltage of the source electrode may remain constant, or may vary at a minimal level. Hence, the body effect on the first transistor TR1 may be mitigated, and the display quality may be improved.

The eleventh period PR11 may correspond to a period during which the light emitting element LE emits light.

Referring to FIGS. 7 to 19, the voltage level of the fourth power supply Vref may be determined by considering the following characteristics.

An electrode of the first capacitor C1 may be electrically connected to the first node N1. A counter electrode of the first capacitor C1 may be electrically connected to the fourth power line PL4. An electrode of the second capacitor C2 may be electrically connected to the first node N1. A counter electrode of the second capacitor C2 may be electrically connected to the fourth power line PL4.

High capacitance of the first capacitor C1 and the second capacitor C2 may assist in increasing the integration density of the sub-pixel. A capacitor with high capacitance may have a relatively low breakdown voltage, compared to a capacitor with low capacitance. In case that a voltage higher than the breakdown voltage is applied to a capacitor, electrons may flow through a dielectric between the capacitor electrodes. Hence, the dielectric, which is a non-conductor, may have conductive properties similar to a conductor, thus making it impossible for the capacitor to function as a capacitor.

Referring again to FIGS. 7 to 19, the first capacitor C1 and the second capacitor C2 may receive the fourth power voltage Vref or a voltage corresponding thereto during at least some periods within an operating period of the display device. Therefore, the fourth power voltage Vref may be set within an appropriately low range.

Simultaneously, the first capacitor C1 and the second capacitor C2 may store the third power voltage Vint or a voltage corresponding thereto (e.g., Vint+|Vth|_TR5; refer to Equations 4 and 13). Hence, the fourth power voltage Vref may be set within a higher range than the third power voltage Vint. Based on the foregoing description, the fourth power voltage Vref may be set within a range defined by the Equation 20 below.

$$Vint < Vref < ELVDD \qquad \text{[Equation 20]}$$

In Equation 20, Vint may be the third power voltage. Vref may be the fourth power voltage. ELVDD may be the first power voltage.

Consequently, in a sub-pixel and a display device including the sub-pixel in accordance with embodiments of the disclosure, the body effect may be mitigated, and the display quality may be improved.

Figure 20:
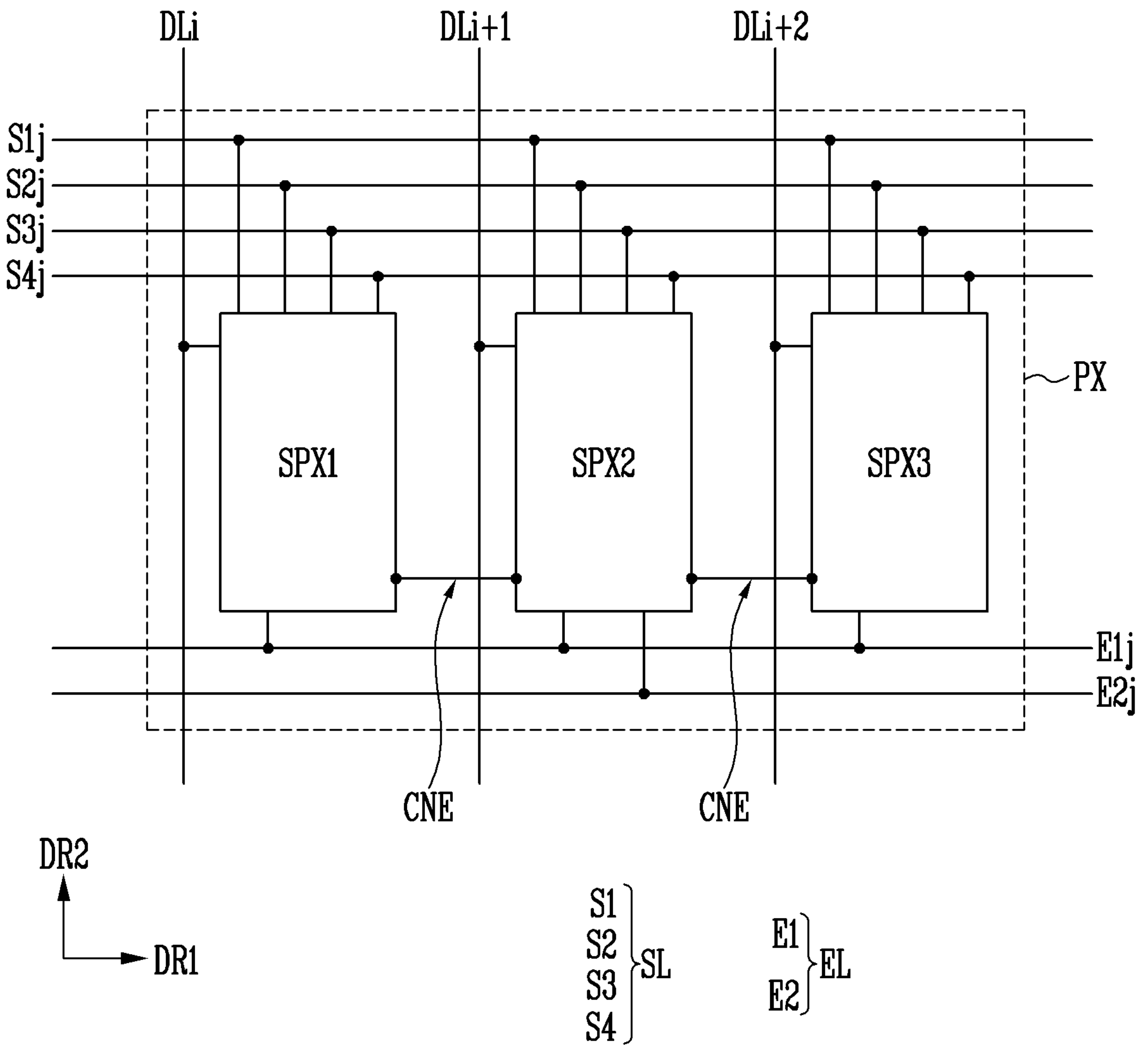
FIG. 20 is a schematic diagram of the pixel of FIG. 2 in accordance with another embodiment of the disclosure.

FIG. 20 is a schematic diagram of the pixel PX of FIG. 2 in accordance with another embodiment of the disclosure.

Referring to FIG. 20, the pixel PX in accordance with embodiments of the disclosure may include a first sub-pixel SPX1, a second sub-pixel SPX2, and a third sub-pixel SPX3.

Each of the first to third sub-pixels SPX1 to SPX3 may be electrically connected to a first scan line S1, a second scan line S2, a third scan line S3, and a fourth scan line S4.

At least one of the first to third sub-pixels SPX1 to SPX3 may be electrically connected to the first emission line E1 and the second emission line E2.

At least one of another ones of the first to third sub-pixels SPX1 to SPX3 may be electrically connected to the first emission line E1, and may be insulated from the second emission line E2. The pixel PX may include a connection electrode CNE. The sub-pixel SPX that is insulated from the second emission line E2 may be connected, through the connection electrode CNE, to the sub-pixel SPX that is electrically connected to the second emission line E2.

For example, referring to FIG. 20, the first sub-pixel SPX1 may be electrically connected to the i-th data line DLi, j-th first to fourth scan lines S1*j* to S4*j*, and j-th first emission line E1*j*. The second sub-pixel SPX2 may be electrically connected to the i+1-th data line DLi+1, the j-th first to fourth scan lines S1*j* to S4*j*, and the j-th first and second emission lines E1*j* and E2*j*. The third sub-pixel SPX3 may be electrically connected to the i+2-th data line DLi+2, the j-th first to fourth scan lines S1*j* to S4*j*, and the j-th first emission line E1*j*. The first sub-pixel SPX1 may be connected to the second sub-pixel SPX2 through the connection electrode CNE. The third sub-pixel SPX3 may be connected to the second sub-pixel SPX2 through the connection electrode CNE.

The connection electrode CNE may extend in the first direction DR1 between the first sub-pixel SPX1 and the second sub-pixel SPX2, and may be disposed in the pixel PX. The connection electrode CNE may extend in the first direction DR1 between the second sub-pixel SPX2 and the third sub-pixel SPX3, and may be disposed in the pixel PX.

FIG. 20 schematically illustrates a structure in which the second sub-pixel SPX2 is electrically connected to the second emission line E2*j*, and the first sub-pixel SPX1 and the third sub-pixel SPX3 are insulated from the second emission line E2*j*. However, embodiments of the disclosure are not limited to the foregoing structure. For example, in another embodiment, the first sub-pixel SPX1 may be connected to the second emission line E2*j*, the second sub-pixel SPX2 may be connected to the first sub-pixel SPX1 through the connection electrode CNE, and the third sub-pixel SPX3 may be connected to the first sub-pixel SPX1 through the connection electrode CNE. In another embodiment, the first sub-pixel SPX1 and the second sub-pixel SPX2 may be connected to the second emission line E2*j*, and the third sub-pixel SPX3 may be connected to the first sub-pixel SPX1 or the second sub-pixel SPX2 through the connection electrode CNE. For the sake of convenience in explanation, an embodiment that the second sub-pixel SPX2 is electrically connected to the second emission line E2*j*, and each of the first sub-pixel SPX1 and the third sub-pixel SPX3 is connected to the second sub-pixel SPX2 through the connection electrode CNE is described. However, it should be noted that embodiments of the disclosure are not limited to the foregoing case.

Figure 21:
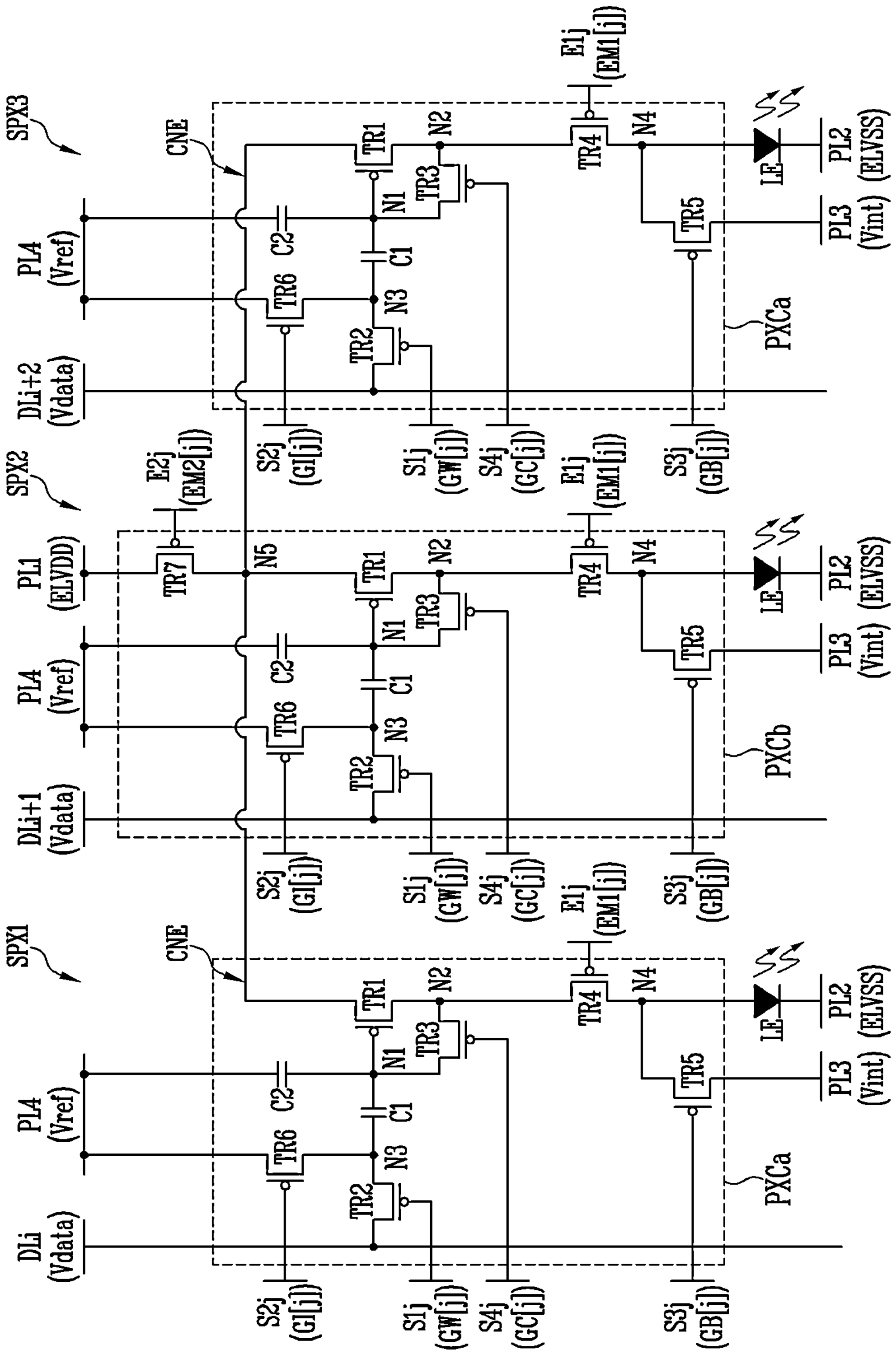
FIG. 21 is a schematic diagram of an equivalent circuit of sub-pixels that form the pixel of FIG. 20.

FIG. 21 is a schematic diagram of an equivalent circuit of sub-pixels SPX1, SPX2, and SPX3 that form the pixel PX of FIG. 20.

Referring to FIG. 21, at least one of the first to third sub-pixels SPX1, SPX2, and SPX3 may include a first pixel circuit PXCa. At least one of another ones of the first to third sub-pixels SPX1, SPX2, and SPX3 may include a second pixel circuit PXCb.

Unlike the pixel circuit PXC described with reference to FIG. 4, the first pixel circuit PXCa may not include the seventh transistor TR7. The source electrode of the first transistor TR1 may be electrically connected to the connection electrode CNE. The connection electrode CNE may extend from the first pixel circuit PXCa toward the second pixel circuit PXCb (e.g., in a direction in which scan lines S1*j*, S2*j*, S3*j*, and S4*j* and/or the emission lines E1*j* and E2*j* extend). The connection electrode CNE may be electrically connected to the fifth node N5 of the second pixel circuit PXCb. At least one of the sub-pixels SPX1, SPX2, and SPX3 may share the seventh transistor TR7 with another one.

Accordingly, the source electrode of the first transistor TR1 of the first sub-pixel SPX1 may be electrically connected to the first power line PL1 through the connection electrode CNE and the seventh transistor TR7 of the second sub-pixel SPX2. The source electrode of the first transistor TR1 of the third sub-pixel SPX3 may be electrically connected to the first power line PL1 through the connection electrode CNE and the seventh transistor TR7 of the second sub-pixel SPX2. Thereby, the integration density of the pixel may be increased.

The display device driving methods (700 and 1300; refer to FIGS. 7 and 13, respectively) described above may be applied to the display device that includes the pixel depicted in FIG. 21.

In a sub-pixel and a display device including the sub-pixel in accordance with embodiments of the disclosure, mitigation of the body effect may lead to an improvement in display quality.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A sub-pixel, comprising:

a light emitting element including a first electrode, a second electrode, and an emission layer provided between the first electrode and the second electrode;

a first transistor including a gate terminal electrically connected to a first node, a drain terminal electrically connected to a second node, a body terminal to which a first power voltage is applied, and a source terminal;

a second transistor that switches electrical connection between a third node and a data line to which a data voltage is applied;

a third transistor that switches electrical connection between the first node and the second node;

a fourth transistor that switches electrical connection between the second node and the first electrode of the light emitting element;

a fifth transistor that is electrically connected to the first electrode of the light emitting element, and supplies an initialization voltage to the first electrode of the light emitting element;

a sixth transistor that applies a reference voltage to the third node in response to a scan signal;

a seventh transistor that switches electrical connection between the source terminal of the first transistor and a first power line to which the first power voltage is applied;

a first capacitor including a first electrode connected to the first node, and a second electrode connected to the third node; and a second capacitor including a first electrode connected to the first node, and a second electrode to which the reference voltage is applied.

2. The sub-pixel according to claim 1, wherein at least one of the first to the seventh transistors comprises a field-effect transistor including a P-channel metal oxide semiconductor.

3. The sub-pixel according to claim 1, wherein at least one of the first to the seventh transistors is formed on a silicon substrate.

4. The sub-pixel according to claim 1, wherein the second electrode of the light emitting element is electrically connected to a second power line to which a second power voltage is applied, and a sum of the initialization voltage and a threshold voltage of the fifth transistor is less than a sum of the second power voltage and a threshold voltage of the light emitting element.

5. The sub-pixel according to claim 4, wherein the reference voltage is higher than the initialization voltage, and is lower than the first power voltage.

6. The sub-pixel according to claim 1, wherein the first transistor is electrically connected to the seventh transistor on a fourth node, the sub-pixel further comprises a connection electrode electrically connected to the first transistor and the seventh transistor on the fourth node, and the connection electrode extends in a direction toward another sub-pixel adjacent to the sub-pixel.

7. A display device, comprising:

a display panel on which a plurality of sub-pixels are disposed, a plurality of data lines electrically connected to the plurality of sub-pixels and extending in a first direction are disposed, and a plurality of scan lines and a plurality of emission lines electrically connected to the plurality of sub-pixels and extending in a second direction are disposed;

a data driving circuit that supplies data voltage to the plurality of data lines;

a scan driving circuit that supplies a first scan signal, a second scan signal, a third scan signal and a fourth scan signal to the plurality of scan lines; and a power supplying circuit that supplies a first power voltage, a second power voltage, a third power voltage, and a fourth power voltage to the plurality of sub-pixels, wherein one of the plurality of sub-pixels comprises:

a light emitting element including a first electrode, a second electrode, and an emission layer provided between the first electrode and the second electrode;

a first transistor including a gate terminal electrically connected to a first node, a drain terminal electrically connected to a second node, a body terminal to which a first power voltage is applied, and a source terminal;

a second transistor that receives the data voltage in response to the first scan signal, and switches electrical connection between a third node and a corresponding one of the plurality of data lines to which the data voltage is applied;

a third transistor that switches electrical connection between the first node and the second node;

a fourth transistor that switches electrical connection between the second node and the first electrode of the light emitting element;

a fifth transistor that is electrically connected to the first electrode of the light emitting element, and supplies third power voltage to the first electrode of the light emitting element;

a sixth transistor that applies the fourth power voltage to the third node in response to the second scan signal;

a seventh transistor that switches electrical connection between the source terminal of the first transistor and a first power line to which the first power voltage is applied;

a first capacitor including a first electrode connected to the first node, and a second electrode connected to the third node; and a second capacitor including a first electrode connected to the first node, and a second electrode to which the fourth power voltage is applied.

8. The display device according to claim 7, wherein
the second electrode of the light emitting element is electrically connected to a second power line to which the second power voltage is applied, and
the power supplying circuit supplies the third power voltage set such that a sum of the third power voltage and a threshold voltage of the fifth transistor is less than a sum of the second power voltage and a threshold voltage of the light emitting element.

9. The display device according to claim 8, wherein the power supplying circuit supplies the fourth power voltage having a voltage level higher than the third power voltage and less than the first power voltage.

10. The display device according to claim 7, wherein
the second transistor is controlled in response to the first scan signal,
the sixth transistor is controlled in response to the second scan signal,
the fifth transistor is controlled in response to the third scan signal, and
the third transistor is controlled in response to the fourth scan signal.

11. The display device according to claim 10, wherein during one frame period,
a length of a period in which the scan driving circuit applies a turn-on level of the first scan signal to the plurality of sub-pixels is less than a length of a period in which the scan driving circuit applies a turn-on level of the second scan signal to the plurality of sub-pixels, and
the length of the period in which the scan driving circuit applies the turn-on level of the second scan signal to the plurality of sub-pixels is less than a length of a period in which the scan driving circuit applies a turn-on level of the third scan signal to the plurality of sub-pixels.

12. The display device according to claim 10, wherein during one frame period,
a length of a period in which the scan driving circuit applies a turn-on level of the first scan signal to the plurality of sub-pixels, a length of a period in which the scan driving circuit applies a turn-on level of the second scan signal to the plurality of sub-pixels, and a length of a period in which the scan driving circuit applies a turn-on level of the fourth scan signal to the plurality of sub-pixels are identical to each other, and
a length of a period in which the scan driving circuit applies a turn-on level of the third scan signal to the plurality of sub-pixels is greater than the length of the period in which the scan driving circuit applies the first, the second, and the fourth scan signals to the plurality of sub-pixels.

13. The display device according to claim 10, further comprising:
an emission driving circuit that supplies a first emission signal and a second emission signal to the plurality of emission lines, wherein
the fourth transistor is controlled in response to the first emission signal, and
the seventh transistor is controlled in response to the second emission signal.

14. The display device according to claim 13, wherein during one frame period,
a length of a period in which the emission driving circuit applies a turn-off level of the first emission signal to the plurality of sub-pixels is identical to a length of a period in which the emission driving circuit applies a turn-off level of the second emission signal to the plurality of sub-pixels, and
the length of the period in which the emission driving circuit applies a turn-off level of the second emission signal to the plurality of sub-pixels is identical to a length of a period in which the emission driving circuit applies a turn-on level of the first emission signal to the plurality of sub-pixels.

15. The display device according to claim 13, wherein during one frame period,
a length of a period in which the emission driving circuit applies a turn-off level of the first emission signal to the plurality of sub-pixels is identical to a length of a period in which the emission driving circuit applies a turn-off level of the second emission signal to the plurality of sub-pixels, and
the length of the period in which the emission driving circuit applies a turn-off level of the second emission signal to the plurality of sub-pixels is greater than a length of a period in which the scan driving circuit applies a turn-on level of the first, the second, and the fourth scan signals to the plurality of sub-pixels, and is less than a length of a period in which the scan driving circuit applies a turn-on level of the third scan signal to the plurality of sub-pixels.

16. The display device according to claim 13, wherein
one frame period includes a first period, a second period, a third period, a fourth period, and a fifth period,
during the first period, the scan driving circuit applies a turn-off level of the first scan signal, a turn-on level of the second scan signal, a turn-on level of the third scan signal, and a turn-off level of the fourth scan signal to the plurality of sub-pixels, and the emission driving circuit applies a turn-on level of the first emission signal and a turn-off level of the second emission signal to the plurality of sub-pixels,
during the second period, the scan driving circuit applies the turn-off level of the first scan signal, the turn-on level of the second scan signal, the turn-on level of the third scan signal, and a turn-on level of the fourth scan signal to the plurality of sub-pixels, and the emission driving circuit applies the turn-on level of the first emission signal and the turn-off level of the second emission signal to the plurality of sub-pixels,
during the third period, the scan driving circuit applies a turn-on level of the first scan signal, a turn-off level of the second scan signal, the turn-on level of the third scan signal, and the turn-on level of the fourth scan signal to the plurality of sub-pixels, and the emission driving circuit applies a turn-off level of the first emission signal and a turn-on level of the second emission signal to the plurality of sub-pixels,
during the fourth period, the scan driving circuit applies the turn-off level of the first scan signal, the turn-on level of the second scan signal, the turn-on level of the third scan signal, and the turn-off level of the fourth scan signal to the plurality of sub-pixels, and the emission driving circuit applies the turn-on level of the first emission signal and the turn-on level of the second emission signal to the plurality of sub-pixels, and
during the fifth period, the scan driving circuit applies the turn-off level of the first scan signal, the turn-on level of the second scan signal, the turn-off level of the third scan signal, and the turn-off level of the fourth scan signal to the plurality of sub-pixels, and the emission driving circuit applies the turn-on level of the first emission signal and the turn-on level of the second emission signal to the plurality of sub-pixels.

17. The display device according to claim 13, wherein one frame period includes a first period, a second period, a third period, a fourth period, a fifth period, and a sixth period, during the first period, the scan driving circuit applies a turn-off level of the first scan signal, a turn-off level of the second scan signal, a turn-on level of the third scan signal, and a turn-off level of the fourth scan signal to the plurality of sub-pixels, and the emission driving circuit applies a turn-on level of the first emission signal and a turn-off level of the second emission signal to the plurality of sub-pixels, during the second period, the scan driving circuit applies the turn-off level of the first scan signal, a turn-on level of the second scan signal, the turn-on level of the third scan signal, and a turn-on level of the fourth scan signal to the plurality of sub-pixels, and the emission driving circuit applies the turn-on level of the first emission signal and the turn-off level of the second emission signal to the plurality of sub-pixels, during the third period, the scan driving circuit applies the turn-off level of the first scan signal, the turn-on level of the second scan signal, the turn-on level of the third scan signal, and the turn-on level of the fourth scan signal to the plurality of sub-pixels, and the emission driving circuit applies a turn-off level of the first emission signal and a turn-on level of the second emission signal to the plurality of sub-pixels, during the fourth period, the scan driving circuit applies a turn-on level of the first scan signal, the turn-off level of the second scan signal, the turn-on level of the third scan signal, and the turn-off level of the fourth scan signal to the plurality of sub-pixels, and the emission driving circuit applies the turn-off level of the first emission signal and the turn-on level of the second emission signal to the plurality of sub-pixels, during the fifth period, the scan driving circuit applies the turn-on level of the first scan signal, the turn-off level of the second scan signal, the turn-on level of the third scan signal, and the turn-off level of the fourth scan signal to the plurality of sub-pixels, and the emission driving circuit applies the turn-on level of the first emission signal and the turn-off level of the second emission signal to the plurality of sub-pixels, and during the sixth period, the scan driving circuit applies the turn-off level of the first to the fourth scan signals to the plurality of sub-pixels, and the emission driving circuit applies the turn-on level of the first and the second emission signals to the plurality of sub-pixels.

18. The display device according to claim 7, wherein another sub-pixel disposed adjacent to one of the plurality of sub-pixels includes a connection electrode, and the connection electrode is electrically connected to the first transistor and the seventh transistor on a fourth node.

19. The display device according to claim 18, wherein the one of the plurality of sub-pixels and the another sub-pixel share the seventh transistor.

* * * * *